US009477262B2

(12) United States Patent
Matsuoka et al.

(10) Patent No.: US 9,477,262 B2
(45) Date of Patent: Oct. 25, 2016

(54) MOVEABLE DISPLAY PORTION OF A COMPUTING DEVICE INCLUDING A CLUTCH MECHANISM

(75) Inventors: Yoshimichi Matsuoka, Cupertino, CA (US); Felix Jose Alvarez Rivera, San Jose, CA (US)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/608,925

(22) Filed: Sep. 10, 2012

(65) Prior Publication Data
US 2014/0071603 A1    Mar. 13, 2014

(51) Int. Cl.
G06F 1/16    (2006.01)
H04M 1/02    (2006.01)

(52) U.S. Cl.
CPC ........... G06F 1/1616 (2013.01); G06F 1/1624 (2013.01); G06F 1/1679 (2013.01); G06F 1/1681 (2013.01); G06F 1/162 (2013.01); H04M 1/0237 (2013.01); H04M 1/0239 (2013.01)

(58) Field of Classification Search
CPC .... G06F 1/1616; G06F 1/1624; G06F 1/162; G06F 1/1679; G06F 1/1681; H04M 1/0237; H04M 1/0239
USPC .............. 361/679.06, 679.27, 679.3, 679.55, 361/807, 679.26; 455/575.1, 575.3, 575.4
See application file for complete search history.

(56) References Cited

U.S. PATENT DOCUMENTS

| | | | |
|---|---|---|---|
| 4,993,975 A | 2/1991 | Asick et al. | |
| 5,229,757 A | 7/1993 | Takamiya et al. | |
| 5,267,123 A | 11/1993 | Boothroyd et al. | |
| 5,278,725 A | 1/1994 | Konno et al. | |
| 5,548,478 A * | 8/1996 | Kumar et al. | 361/679.27 |
| 5,708,561 A | 1/1998 | Huilgol et al. | |
| 5,751,544 A | 5/1998 | Song | |
| 5,771,540 A | 6/1998 | Carpenter et al. | |
| 5,805,415 A | 9/1998 | Tran et al. | |
| 6,384,811 B1 | 5/2002 | Kung et al. | |

(Continued)

FOREIGN PATENT DOCUMENTS

| | | |
|---|---|---|
| EP | 1227387 A1 | 7/2002 |
| EP | 1916826 A1 | 4/2008 |

(Continued)

OTHER PUBLICATIONS

Search Report and Written Opinion for International Application No. PCT/US13/57810, mailed Dec. 18, 2013, 11 pages.

(Continued)

*Primary Examiner* — James Wu
(74) *Attorney, Agent, or Firm* — Brake Hughes Bellermann LLP

(57) ABSTRACT

A computing device can include a base portion including a keyboard and a base coupling mechanism fixedly coupled to the base portion where the base coupling mechanism includes a rotating receiver. The computing device can include a display portion having a display coupling mechanism configured to be removably coupled to the rotating receiver of the base coupling mechanism. The display coupling mechanism of the display portion can be configured to be coupled to the rotating receiver of the base coupling mechanism in response to the display portion being slidably moved with respect to the base portion when a viewable surface of the display portion is aligned along a plane substantially parallel to a plane along which the keyboard of the base portion is aligned.

21 Claims, 23 Drawing Sheets

(56) References Cited

U.S. PATENT DOCUMENTS

| | | |
|---|---|---|
| 6,392,877 B1 | 5/2002 | Iredale |
| 6,404,622 B1 | 6/2002 | Chen |
| 6,481,057 B2 | 11/2002 | Lin |
| 6,483,445 B1 | 11/2002 | England |
| 6,522,529 B1 | 2/2003 | Huilgol et al. |
| 6,714,403 B2 | 3/2004 | Furuki et al. |
| 6,751,090 B1 | 6/2004 | Yang |
| 6,816,365 B2 | 11/2004 | Hill et al. |
| 6,842,338 B2 | 1/2005 | Iredale |
| 6,850,226 B2 | 2/2005 | Finke-Anlauff |
| 6,903,927 B2 | 6/2005 | Anlauff |
| D517,541 S | 3/2006 | Maskatia |
| D519,500 S | 4/2006 | Maskatia et al. |
| 7,055,215 B1 | 6/2006 | Ligtenberg et al. |
| 7,092,246 B2 | 8/2006 | Tanaka et al. |
| D528,541 S | 9/2006 | Maskatia |
| 7,107,084 B2 | 9/2006 | Duarte et al. |
| 7,129,931 B2 | 10/2006 | Pappas |
| 7,203,058 B2 | 4/2007 | Hong |
| 7,215,538 B1 | 5/2007 | Chen et al. |
| 7,646,593 B2 | 1/2010 | Smejkalova |
| 7,679,890 B2 | 3/2010 | Yang |
| 7,755,904 B2 | 7/2010 | Wu et al. |
| D621,827 S | 8/2010 | Cheng et al. |
| 7,984,532 B2 | 7/2011 | Huang |
| D649,543 S | 11/2011 | Tseng et al. |
| 8,091,178 B2 | 1/2012 | Degner et al. |
| 8,200,300 B2 * | 6/2012 | Wang et al. ............... 455/575.4 |
| 2004/0174666 A1 | 9/2004 | Brandenberg et al. |
| 2005/0041378 A1 | 2/2005 | Hamada et al. |
| 2005/0041381 A1 | 2/2005 | Maskatia et al. |
| 2005/0122318 A1 | 6/2005 | Tonouchi et al. |
| 2006/0267947 A1 | 11/2006 | Nishiyama et al. |
| 2007/0186382 A1 | 8/2007 | Huang |
| 2008/0047102 A1 | 2/2008 | Kim |
| 2008/0120809 A1 | 5/2008 | Nakasone |
| 2008/0180892 A1 | 7/2008 | Lai |
| 2008/0238816 A1 | 10/2008 | Matsushita |
| 2009/0007383 A1 * | 1/2009 | Lee ................................ 16/362 |
| 2009/0117953 A1 * | 5/2009 | Oh ............................. 455/575.1 |
| 2009/0244009 A1 | 10/2009 | Staats et al. |
| 2010/0014237 A1 | 1/2010 | Takizawa |
| 2010/0295426 A1 | 11/2010 | Zhu et al. |
| 2011/0211307 A1 | 9/2011 | Takizawa |
| 2012/0020002 A1 | 1/2012 | Mathew et al. |
| 2012/0106060 A1 | 5/2012 | Probst et al. |
| 2012/0154999 A1 * | 6/2012 | Park .......................... 361/679.01 |
| 2012/0162889 A1 | 6/2012 | Han |

FOREIGN PATENT DOCUMENTS

| | | |
|---|---|---|
| WO | 9603685 A1 | 4/1999 |
| WO | 2012092022 A1 | 7/2012 |

OTHER PUBLICATIONS

Final Office Action for U.S. Appl.No. 12/979,588, mailed Mar. 15, 2013, 20 pages.

Final Office Action Response for U.S. Appl. No. 12/979,588, mailed Jan. 9, 2013, 13 pages.

Non-Final Office Action for U.S. Appl. No. 12/979,588, mailed Oct. 12, 2012, 23 pages.

Search Report and Written Opinion for International Application No. PCT/US2011/066182, mailed Mar. 8, 2012, 19 pages.

Schock, "How to Fix a Wobbly Macbook Pro Screen", retrieved from schock.net/articles/2012/02/20/how-to-fix-a-wobbly-macbook-pro-screen/, Feb. 20, 2012, 4 pages.

International Preliminary Report on Patentability for International Application No. PCT/US2013/057810, mailed Mar. 19, 2015, 8 pages.

* cited by examiner

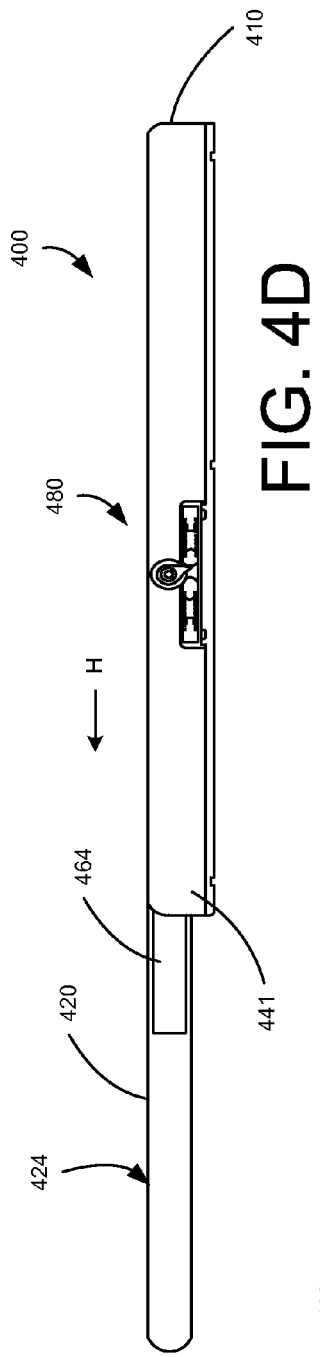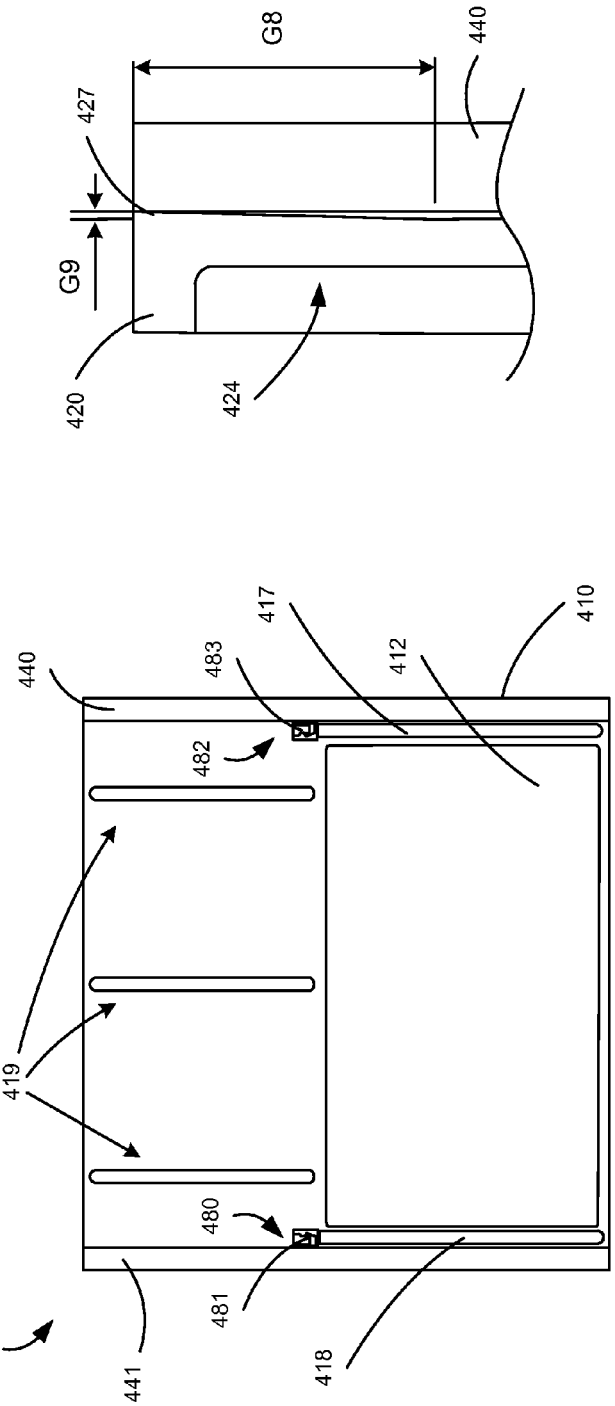

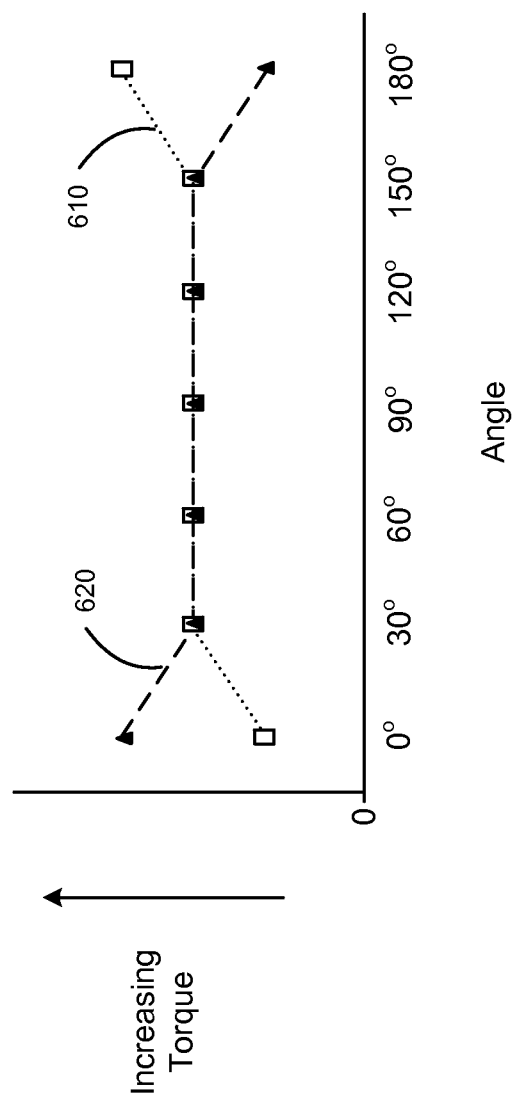

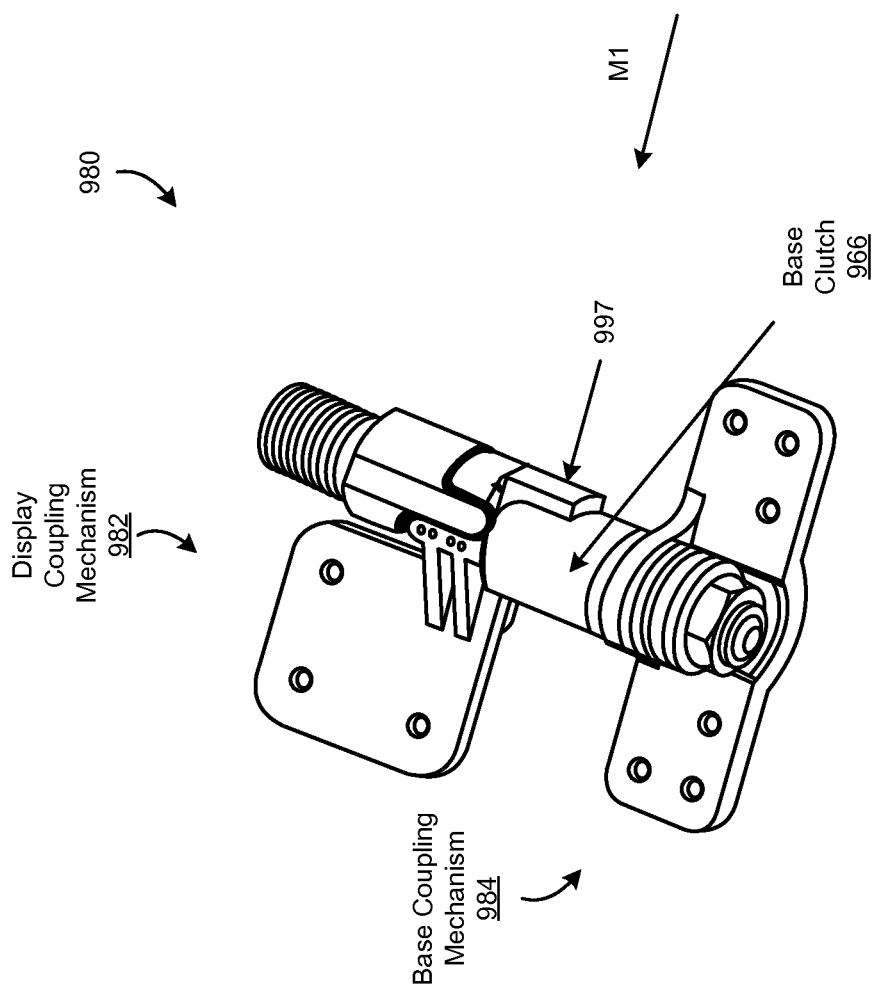

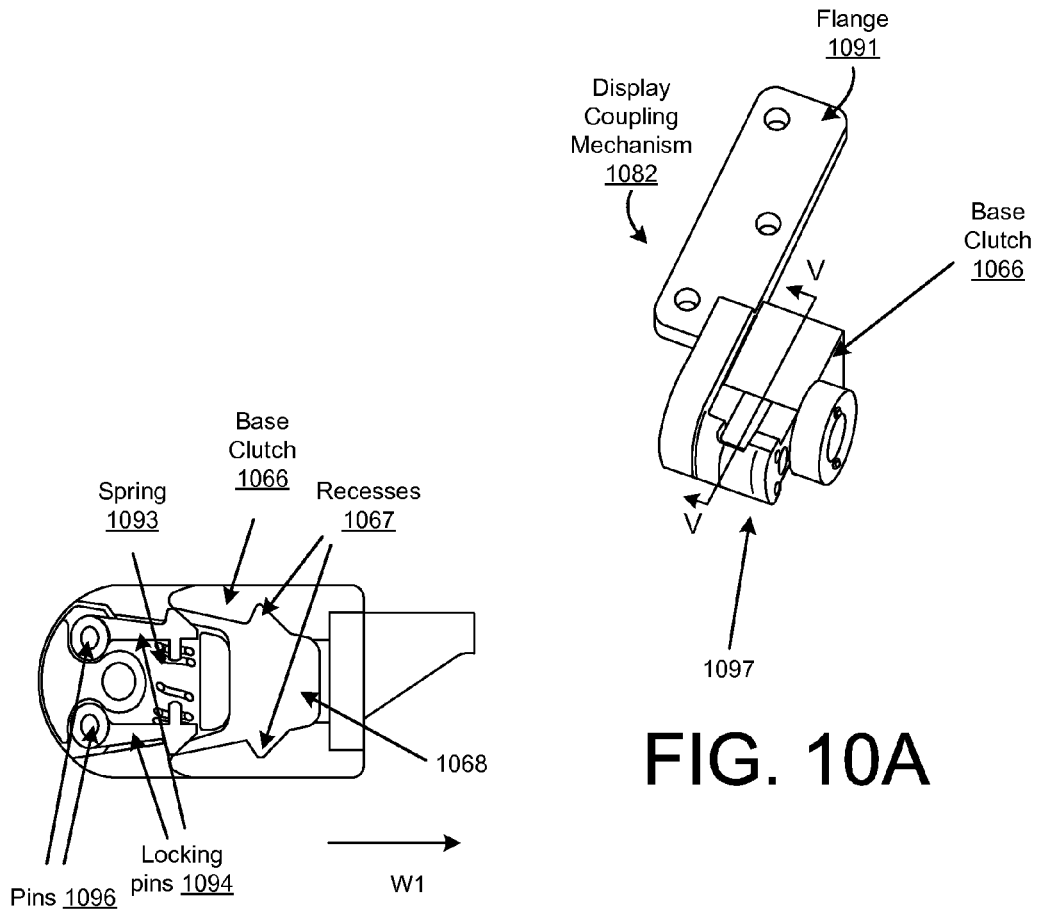
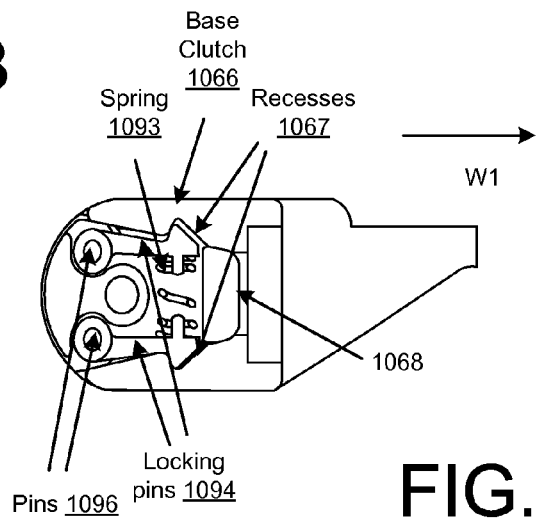
FIG. 10B
FIG. 10C

MOVEABLE DISPLAY PORTION OF A COMPUTING DEVICE INCLUDING A CLUTCH MECHANISM

TECHNICAL FIELD

This description relates to a moveable display portion of a computing device including a clutch mechanism.

BACKGROUND

Known computing devices can have several mechanisms through which a user may interact with (e.g., trigger) one or more functions of the computing device. For example, user input devices such as keyboards, mouse devices, touch screen displays and/or so forth, through which a user may interact with computing devices to perform one or more computing functions, can be connected with and/or integrated into the computing devices. However, these user input devices may be cumbersome to use and/or may not produce results at a desirable speed, level of accuracy, and/or with a desired effect.

SUMMARY

In one general aspect, a computing device can include a base portion including a keyboard and a base coupling mechanism fixedly coupled to the base portion where the base coupling mechanism includes a rotating receiver. The computing device can include a display portion having a display coupling mechanism configured to be removably coupled to the rotating receiver of the base coupling mechanism. The display coupling mechanism of the display portion can be configured to be coupled to the rotating receiver of the base coupling mechanism in response to the display portion being slidably moved with respect to the base portion when a viewable surface of the display portion is aligned along a plane substantially parallel to a plane along which the keyboard of the base portion is aligned. The display portion can be configured to rotate via the rotating receiver when the display coupling mechanism is coupled to the rotating receiver of the base coupling mechanism.

In another general aspect, an apparatus can include a base coupling mechanism configured to be fixedly coupled to a base portion of a computing device. The base coupling mechanism can include a rotating receiver and a pushpin actuated by a spring. The apparatus can include a display coupling mechanism including a locking mechanism configured to removably couple the display coupling mechanism to the rotating receiver of the base coupling mechanism. The display coupling mechanism can be configured to be fixedly coupled to a display portion of the computing device and configured to rotate about an axis orthogonal to a direction that the pushpin is actuated by the spring when the display portion is coupled to the rotating receiver of the base coupling mechanism.

In yet another general aspect, a computing device can include a base portion including a keyboard and a base coupling mechanism fixedly coupled to the base portion. The base coupling mechanism can include a rotating receiver and a pushpin actuated by a spring. The computing device can include a display portion having a display coupling mechanism configured to be removably coupled to the rotating receiver of the base coupling mechanism and configured to translate along a direction that the pushpin is actuated by the spring.

The details of one or more implementations are set forth in the accompanying drawings and the description below. Other features will be apparent from the description and drawings, and from the claims.

BRIEF DESCRIPTION OF THE DRAWINGS

FIGS. 4A through 4F are diagrams that illustrate various view of a computing device including a clutch mechanism.

FIG. 6 is a graph that illustrates torque with respect to angle for the clutch mechanism shown in FIGS. 5A through 5G.

FIG. 9 is a diagram that illustrates a display coupling mechanism coupled to a base coupling mechanism.

FIGS. 10A through 10C are diagrams that illustrate a base clutch coupled to a portion of a display coupling mechanism.

DETAILED DESCRIPTION

Figure 1:
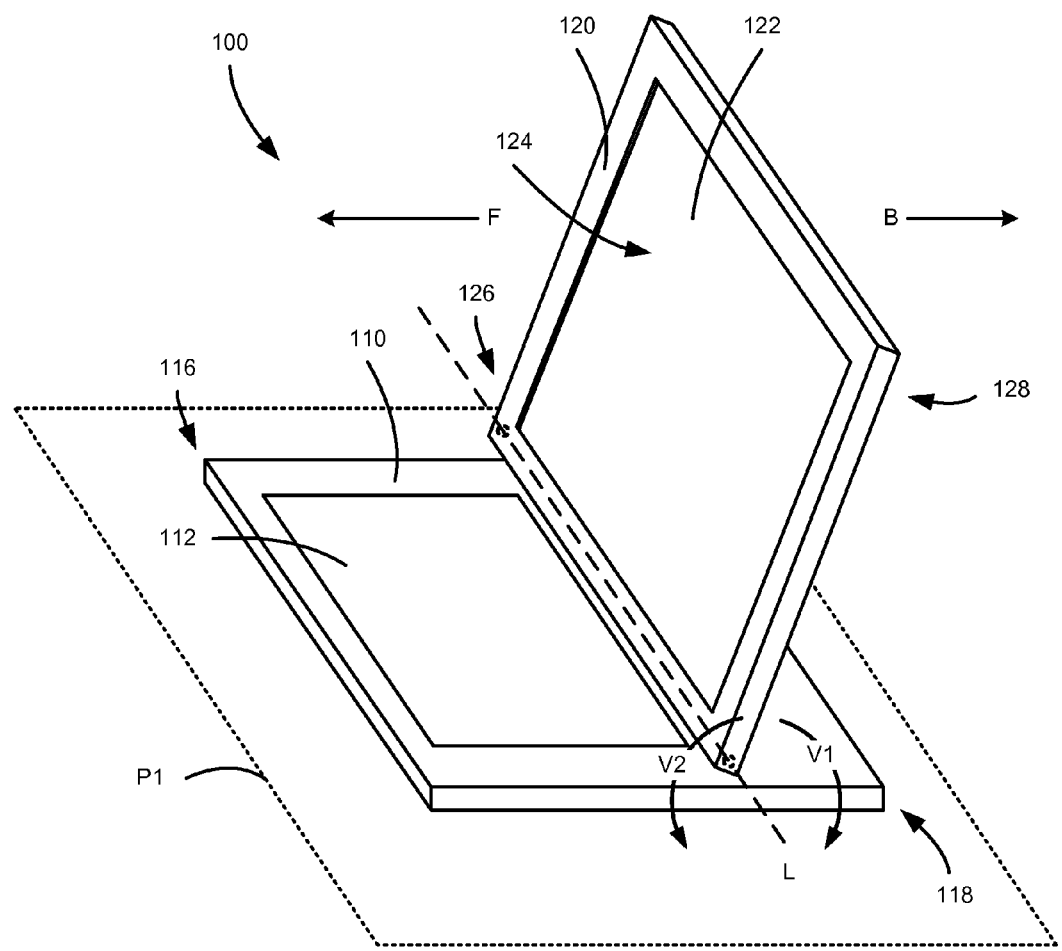
FIG. 1 is a diagram of a computing device with a display portion configured to move with respect to a base portion.

FIG. 1 is a diagram of a computing device 100 including a base portion 110 and a display portion 120. As shown in FIG. 1, the display portion 120 includes a display 122, and the base portion 110 includes an input device region 112. The display 122 can have a display surface 124 (also can be referred to as a viewable surface) upon which illuminated objects can be displayed and viewed by a user. The input device region 112 can include various types of input devices such as, for example, a keyboard, one or more buttons, an electrostatic touchpad to control a mouse cursor, etc.

In this implementation, the display 122 is a touch sensitive display that can be any type of touch sensitive display. In some implementations, the display 122 can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. As a touch sensitive device, the display 122 can function as an input device. For example, the display 122 can be configured to display a virtual keyboard (e.g., emulate a keyboard) that can be used by a user as an input device.

As shown in FIG. 1, the display portion 120 has a bottom portion 126 operably coupled to the base portion 110. The display portion 120 also has a top portion 128 on an end of the display portion 120 that is opposite the bottom portion 126. The base portion 110 has a front portion at a front end 116, and has a back portion at a back end 118 of the base portion 110 of the base portion 110. In this implementation, a distal direction is towards the back end 118 of the base portion 110, and a proximal direction is towards the front end 116 of the base portion 110. Accordingly, the front end 116 can also be referred to as a proximal end of the base portion 110, and the back end 118 can be referred to as a distal end of the base portion 110.

The display portion 120 is configured to rotate and translate with respect to the base portion 110 in various configurations so that the display 122 and input devices included in the input device region 112 can be used differently in the various configurations. For example, the display portion 120 can be configured to rotate and translate from the configuration shown in FIG. 1 (in which the computing device 100 can be used in a fashion similar to a typical laptop computer) to a configuration where the display portion 120 covers one or more input devices included in the input device 112 of the base portion 110 while the display 122 is facing away from the base portion 110 so that the computing device 100 can be used as a tablet-type computing device. More details related to various configurations of the computing device 100 are described below in connection with FIG. 1 as well as the remaining figures.

As shown in FIG. 1, the display portion 120 is configured to rotate about an axis L of the bottom portion 126 of the display portion 120. Specifically, the display portion 120 is configured to rotate about the axis L in a clockwise direction V1 or in a counterclockwise direction V2 as shown in FIG. 1. Thus, the display portion 120 can be configured to rotate between various rotational positions about the axis L.

In this implementation, the display portion 120 can be configured to rotate in the clockwise direction V1 until the display portion 120 is parallel to the base portion 110 (or substantially parallel) and the display surface 124 is facing away from the base portion 110. Said differently, the display portion 120 can be configured to rotate in the clockwise direction V1 until the display portion 120 is flat with respect to the base portion 110. Thus, the display portion 120 and the base portion 110 can be aligned along a common plane (or different planes that are parallel (or substantially parallel) to one another) with the display surface 124 facing away from the base portion 110. In some implementations, when the display portion 120 is positioned such that a plane (e.g., a primary plane) along which the display portion (e.g., a viewable surface of the display portion) is aligned is substantially parallel to a plane P1 (e.g., a primary plane) along which the base portion 110 (e.g., a bottom or top of the base portion 110) is aligned, the computing device 100 can be referred to as being in a tablet configuration. When the computing device 100 is in the tablet configuration, the display surface 124 can be accessible by (e.g., exposed to) a user. In some implementations, the tablet configuration can be characterized as a type of closed configuration because the display portion 120 and the base portion 110 are substantially aligned along a common plane (e.g., plane P1).

Also, the display portion 120 can be configured to rotate in the counterclockwise direction V2 until the display portion 120 is parallel to the base portion 110 (or substantially parallel) with the display surface 124 facing toward the base portion 110. Said differently, the display portion 120 can be configured to rotate in the counterclockwise correction V2 until the display portion 120 is flat with respect to the base portion 110. Thus, the display portion 120 and the base portion 110 can be aligned along a common plane (e.g., plane P1) (or different planes that are parallel (or substantially parallel) to one another) with the display surface 124 facing towards the base portion 110. In some implementations, when the display portion 120 is in the rotational position described above, the computing device 100 can be referred to as being in a closed configuration (or a closed configuration with display down). In some implementations, when the computing device 100 is in the closed configuration, at least a portion of the input device region 112 may not be accessible by a user of the computing device 100.

As shown in FIG. 1, the display portion 120 is also configured to translate with respect to the base portion 110 in a translational direction when the display surface 124 of the display portion 120 is aligned along, or parallel to, plane P1. Specifically, the display portion 120 can be configured to translate in a forward direction (direction F) (i.e., a proximal direction) with respect to the base portion 110 towards the front end 116 of the base portion 110, and can be configured to translate in a backward direction (direction B) (i.e., a distal direction) with respect to the base portion 110 towards the back end 118 of the base portion 110 when the display surface 124 of the display portion 120 is aligned along, or parallel to, plane P1. Thus, the display portion 120 can be configured to move between various translational positions along the base portion 110. As shown in FIG. 1, the forward direction and the backward direction, which can be characterized as translational directions, are orthogonal to (e.g., substantially orthogonal to) the axis L.

In the implementation shown in FIG. 1, the display portion 120 is configured to rotate about the axis L (along direction V1 or V2) when the display portion 120 is in a predetermined translational position with respect to the base portion 110. For example, the display portion 120 can be configured to rotate about the axis L in the clockwise direction V1 or the counterclockwise direction V2 when the display portion 120 is at a first translational position where the display portion 120 is disposed over the front portion of the base portion 110. The display portion 120 may not rotate about the axis L in the clockwise direction V1 or the counterclockwise direction V2 when the display portion 120 is at a second translational position where the display portion 120 is disposed over the back portion of the base portion 110.

Although not shown in FIG. 1, the computing device 100 device can include a clutch mechanism through which the movement of the computing device 100 can be implemented. A base coupling mechanism of the clutch mechanism can be included in the base portion 110 and a display coupling mechanism of the clutch mechanism can be included in the display portion 120 of the computing device 100. The base coupling mechanism of the clutch mechanism can be removably coupled to the display coupling mechanism of the clutch mechanism. When the base coupling mechanism is coupled to (e.g., engaged with) the display coupling mechanism, the display portion 120 can be configured to rotate about the axis L (along direction V1 or V2). When the base coupling mechanism is decoupled from (e.g., not coupled to, disengaged from) the display coupling mechanism, the display portion 120 can be configured to rotate about the axis L (along direction V1 or V2).

In some implementations, the display portion 120 can be rotated and translated with respect to the base portion 110 such that at least a portion of the input device region 112 is covered. For example, when in a closed configuration (with the display 122 facing towards or facing away from the base portion 110), the display portion 120 can be configured to cover at least a portion of the input device region 112 (so that the portion of the input device region 112 is not readily accessible to a user of the computing device 100).

As shown in FIG. 1, the computing device 100 can be a personal computing laptop-type device. In some implementations, the computing device 100 can be any type of computing device. The computing device 100 can be, for example, a wired device and/or a wireless device (e.g., wi-fi enabled device) and can be, for example, a computing entity (e.g., a personal computing device), a server device (e.g., a web server), a mobile phone, a personal digital assistant (PDA), an e-book device, and/or so forth. The computing device 100 can be configured to operate based on one or more platforms (e.g., one or more similar or different platforms) that can include one or more types of hardware, software, firmware, operating systems, runtime libraries, and/or so forth. More details related to various configurations of a computing device that has a display portion configured to move with respect to a base portion are described in connection with the figures below.

FIGS. 2A through 2E are diagrams that illustrate movement of a computing device 200 including a clutch mechanism (not shown). The movement of the computing device 200 can be similar to or the same as that described in connection with FIG. 1. Although the clutch mechanism is not explicitly shown in FIGS. 2A through 2E, the movement of the computing device 200 is based on the clutch mechanism.

The computing device 200 shown in FIGS. 2A through 2E can be similar to, or based on, the functionality of the computing device 100 shown in FIG. 1. The computing device 200 includes a base portion 210 and a display portion 220 operably coupled to the base portion 210 via the clutch mechanism.

The base portion 210 has a front portion at a front end 216, and has a back portion at a back end 218 of the base portion 210. In this implementation, a distal direction is towards the back end 218 of the base portion 210, and a proximal direction is towards the front end 216 of the base portion 210. Accordingly, the front end 216 can also be referred to as a proximal end of the base portion 210, and the back end 218 can be referred to as a distal end of the base portion 210.

Figure 2A:
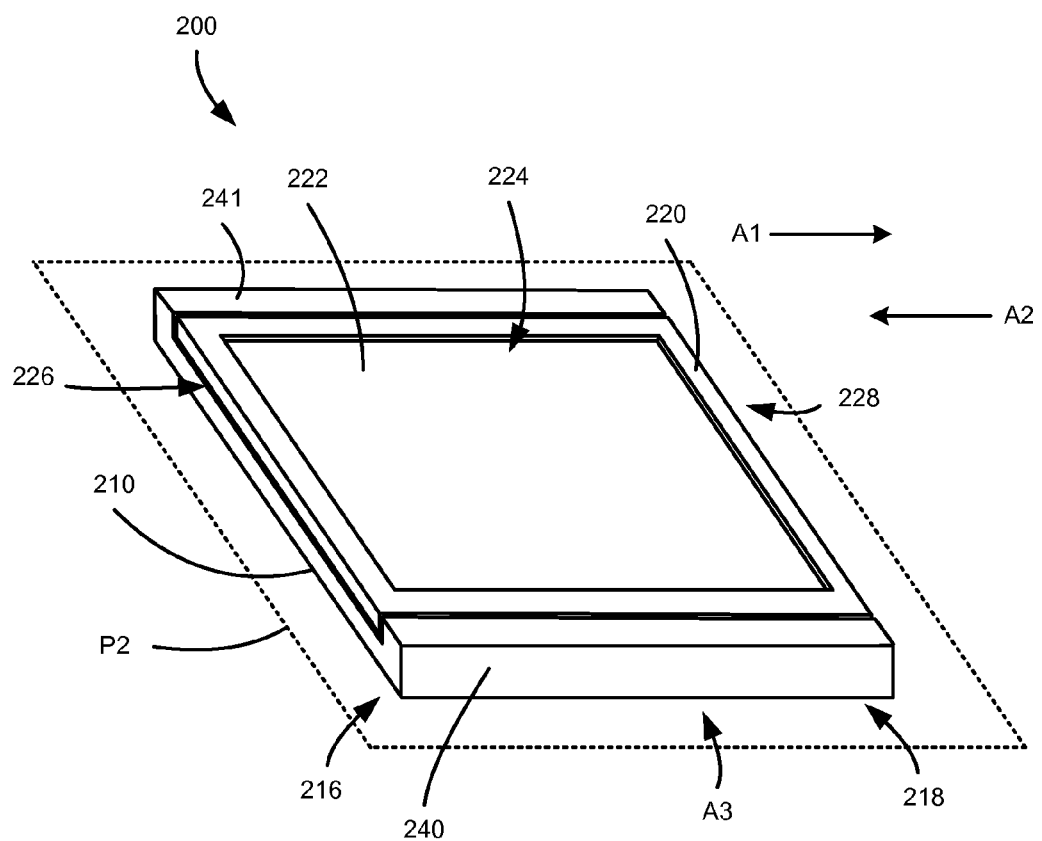
FIGS. 2A through 2E are diagrams that illustrate movement of a computing device including a clutch mechanism.

FIG. 2A is a diagram that illustrates the computing device 200 in a tablet configuration. The display portion 220 of the computing device 200 can be moved from the tablet configuration shown in FIG. 2A by moving the display portion 220 along direction A1 until a bottom portion 226 of the display portion 220 is at approximately point A3 along a guide 240 (or guide portion) of the computing device 200 to the partial tablet configuration shown in FIG. 2B. When the bottom portion 226 of the display portion 220 (which is on an end of the display portion 220 that is opposite a top portion 228) is at approximately point A3 along the guide 240 of the computing device 200, the display portion 220 can be rotated about axis R along direction X to the laptop configuration shown in FIG. 2C. The display portion 220 can be rotated about axis R along direction X to the closed configuration shown in FIG. 2D. The display portion 220 of the computing device 200 can be moved from the closed configuration shown in FIG. 2D by moving the display portion 220 along direction A1 until the bottom portion 226 of the display portion 220 is aligned along the back end 218 of the base portion 220 of the computing device 200 shown in FIG. 2E. As illustrated by FIGS. 2A through 2E, the display portion 220 is moved along direction A1 when moved from the tablet configuration shown in FIG. 2A to the laptop configuration shown in FIG. 2C and when moved from the laptop configuration shown in FIG. 2C to the closed configuration shown in FIG. 2E.

The direction A1, which can be characterized as a translational direction, is orthogonal to (e.g., substantially orthogonal to) the axis R. Also, the axis R can be orthogonal to a longitudinal axis of (or line aligned along) one or more of the guides 240.

Figure 2B:
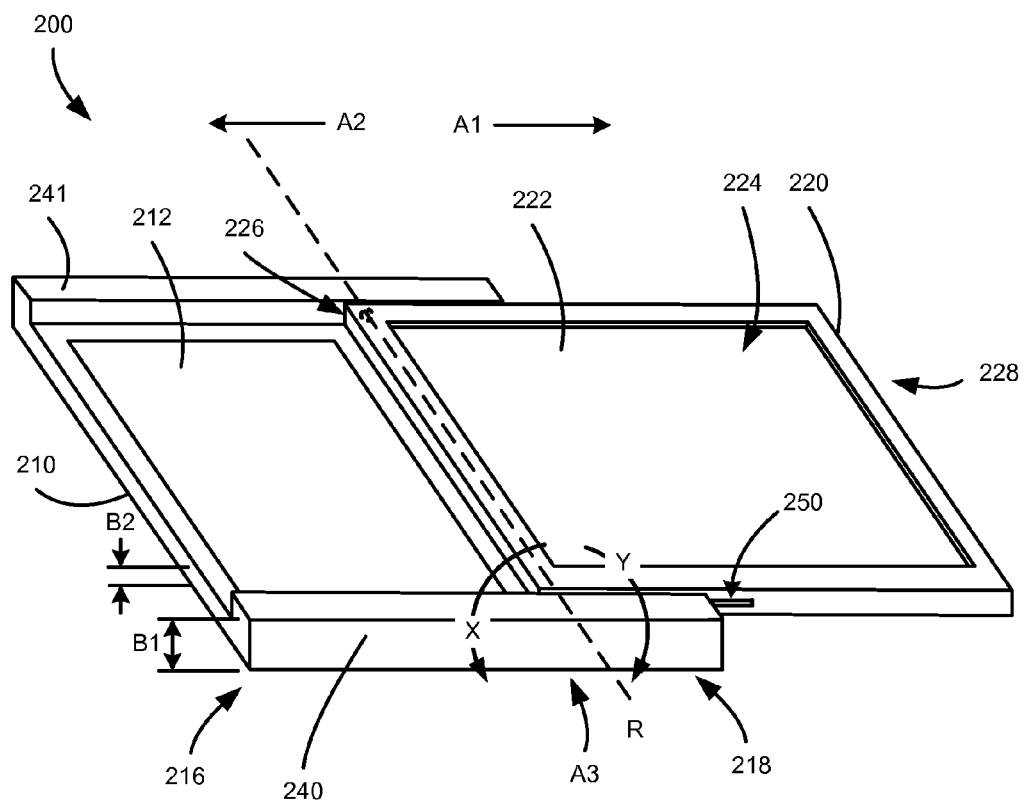
Figure 2C:
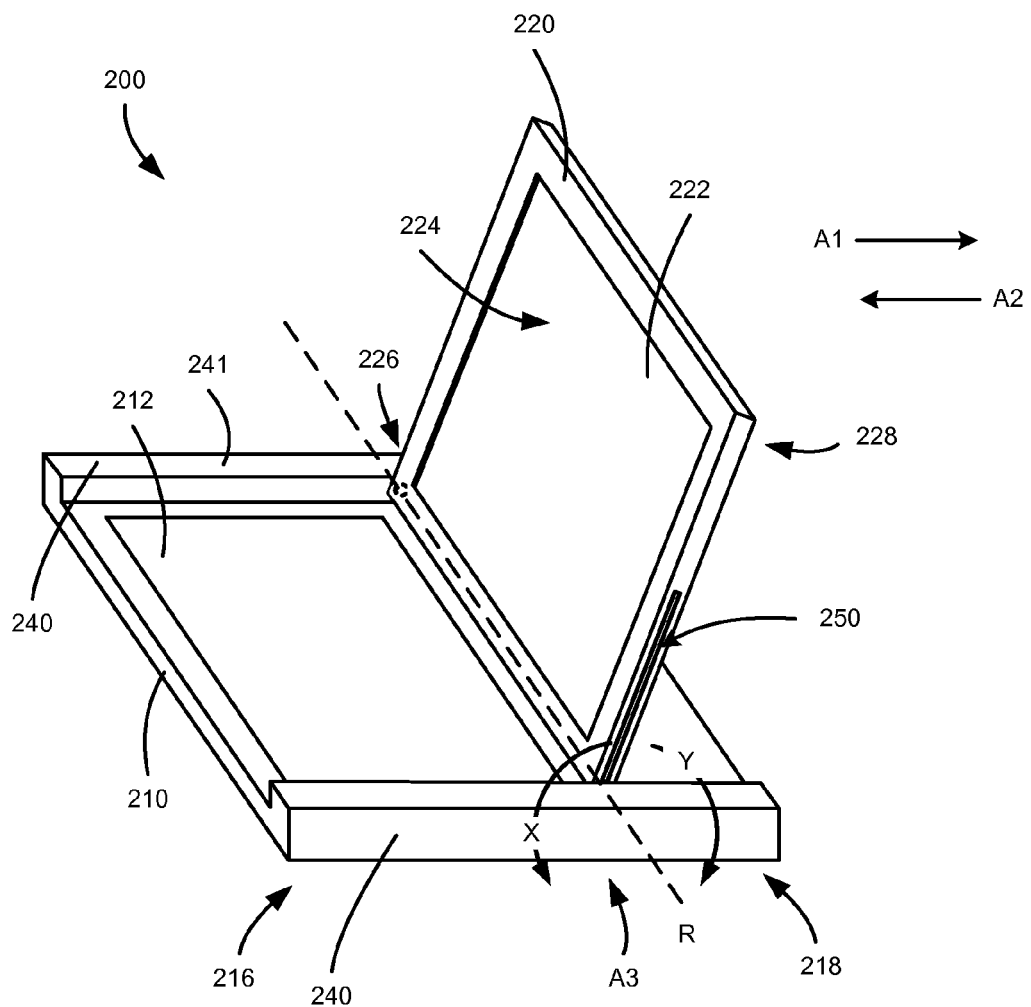
Figure 2D:
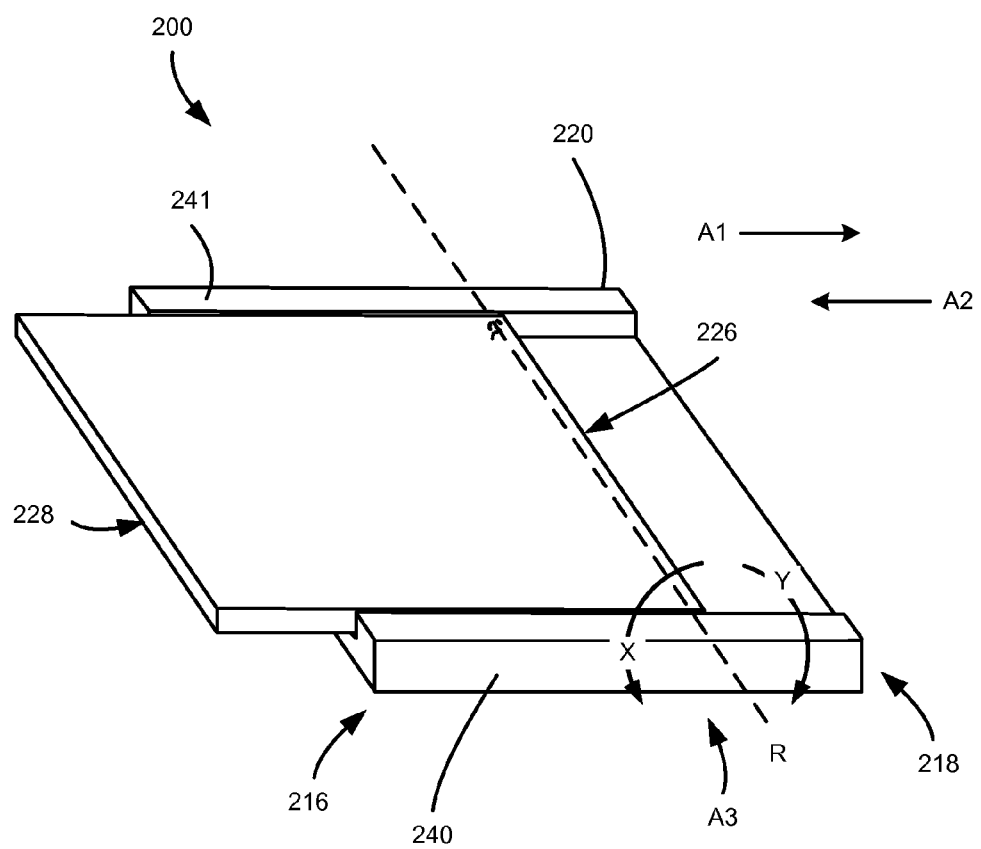
Figure 2E:
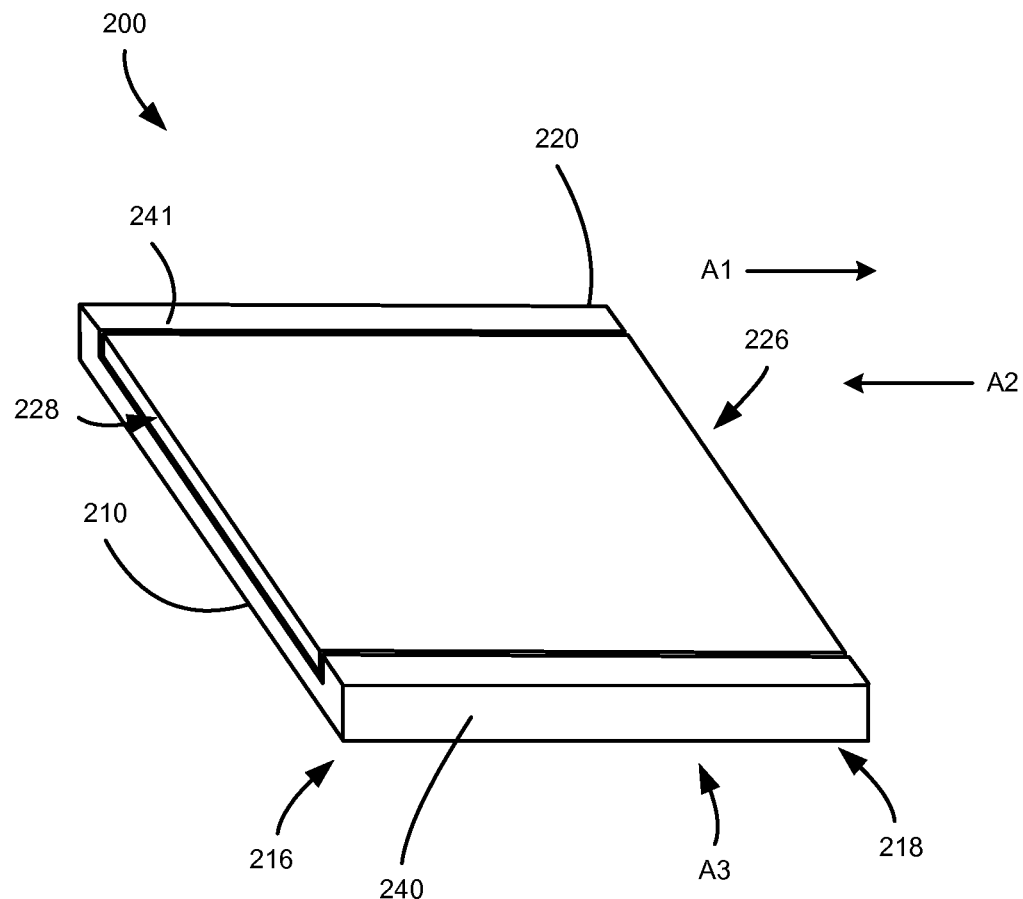

The movement of the computing device 200 can be performed in the reverse order as well (from FIG. 2E to FIG. 2A). Specifically, The display portion 220 of the computing device 200 can be moved from the closed configuration shown in FIG. 2E by moving the display portion 220 along direction A2 until a bottom portion 226 of the display portion 220 is at approximately point A3 along the guide 240 of the computing device 200 to the configuration shown in FIG. 2D. When the bottom portion 226 of the display portion 220 is at approximately point A3 along the guide 240 of the computing device 200, the display portion 220 can be rotated about axis R along direction Y to the laptop configuration shown in FIG. 2C. The display portion 220 can be rotated about axis R along direction Y to the partial tablet configuration shown in FIG. 2B. The display portion 220 of the computing device 200 can be moved from the partial tablet configuration shown in FIG. 2B by moving the display portion 220 along direction A2 until the bottom portion 226 of the display portion 220 is aligned along the front end 216 of the base portion 220 of the computing device 200 shown in FIG. 2E. As illustrated by the reverse sequence of FIGS. 2E through 2A, the display portion 220 is moved along direction A2 when moved from the tablet configuration shown in FIG. 2A to the laptop configuration shown in FIG. 2C and when moved from the laptop configuration shown in FIG. 2C to the closed configuration shown in FIG. 2E.

As shown in FIG. 2A, the guides 240, 241 are coupled to or are included as portions of the base portion 210 of the computing device 200. The guide 240 (and guide 241) has a thickness B1 that is greater than a thickness B2 of a middle portion of the base portion 210 of the computing device 200. In some implementations, the thickness B1 of the guide 240 can be approximately greater than or equal to a combined thickness of the display portion 220 and the thickness B2 of the base portion 210. In some implementations, the thickness B1 of the guide 240 can be less than a combined thickness of the display portion 220 and the thickness B2 of the base portion 210.

The display portion 220 includes a touch sensitive display 222 that has a display surface 224. Thus, the touch sensitive display 222 can function as an input device. For example, the touch sensitive display 222 can be configured to display a virtual keyboard (e.g., emulate a keyboard) that can be used by a user as an input device.

Although not shown, in some implementations, the base portion 210 can include various computing components such as one or more processors, a graphics processor, a motherboard, a memory (e.g., a disk drive, a solid-state drive), and/or so forth. One or more images displayed on the touch sensitive display 222 can be triggered by the computing components included in the base portion 210. In some implementations, one or more wires configured to handle signaling (e.g., video signals, signals generated in response to interactions with the touch sensitive display 222) between the touch sensitive display 222. For example, one or more wires configured to transfer signals between the base portion 210 (e.g., a processor included in the base portion 210) and the touch sensitive display 222 can be disposed inside of at least a portion of the clutch mechanism.

As illustrated by FIGS. 2A through 2E, the display portion 220 can be rotated about axis R when the bottom portion 226 of the display portion 220 is at approximately point A3. At approximately point A3, a base coupling mechanism of the clutch mechanism included in the base portion 210 is coupled to (or engaged with) a display coupling mechanism of the clutch mechanism included in the display portion 220 so that the display portion 220 can be rotated with respect to the base portion 210. The computing device 200 can be configured so that the display portion 220 may not be rotated about axis R when the bottom portion 226 of the display portion 220 is not at approximately point A3 (is at another point along the guides 240, 241). As illustrated by FIGS. 2E through 2A, the display portion 220 is moved through the laptop configuration shown in FIG. 2C when being moved between the tablet configuration shown in FIG. 2A and the closed configuration shown in FIG. 2E.

As shown in FIGS. 2B and 2C, a slot 250 is included in a side of the display portion 220. A slot, which is not shown, can also be included in the opposite side of the display portion 220. When the display surface 224 of the display portion 220 is aligned along the base portion 210, the display portion 220 can be slidably moved so at least a portion of the clutch mechanism can be slidably moved within the slot 250. In some implementations, the slot 250 can be a groove into which one or more portions of the clutch mechanism and can be inserted and slidably moved. More details related to the operation of clutch mechanisms and their components are illustrated and described after FIG. 2E.

In some implementations, one or more detents can be included along the slot 250. In some implementations, the slot 250 can include a member (e.g., a rod) along which one or more portions of the clutch mechanism can slidably move. In some implementations, one or more of the clutch mechanism and/or the slot 250 can include rolling devices such as wheels or ball-bearings that can facilitate translational movement (e.g., facilitate relatively smooth translational movement) of the display portion 220 with respect to the base portion 210. In some implementations, one or more input devices (e.g., a keyboard) included in the input device region 212 can have a fixed position in the base portion 210 with respect to one or more of the guides 240, 241.

As discussed above, FIG. 2A is a diagram that illustrates the computing device 200 in a tablet configuration. The display portion 220 is parallel to the base portion 210 (or substantially parallel) and the display surface 224 is facing away from the base portion 210 as shown in the tablet configuration in FIG. 2A. Thus, the display portion 220 and the base portion 210 can be aligned along a common plane (e.g., plane P2) (or different planes that are parallel (or substantially parallel) to one another) with the display surface 224 facing away from the base portion 210. As shown in FIG. 2A, the display surface 224 is accessible when the computing device 200 is in the tablet configuration.

The touch sensitive display 222 can be the primary input device of the computing device 200 when the computing device 200 is in the tablet configuration. In some implementations, when the computing device 200 is in the tablet configuration, one or more input devices included in the input device region 212 (which is not visible in FIG. 2A because the input device region 212 is covered by the display portion 220) can be deactivated (e.g., disabled, changed to a non-operational state, changed to a standby state). For example, a keyboard included in the input device region 212 can be automatically deactivated (or changed to a deactivated state) when the computing device 200 is in (or moved to) the tablet configuration. Input devices included in the input device region 212 may be deactivated because the input devices may not be accessible when covered by the display portion 220 when the computing device 200 is in the tablet configuration shown in FIG. 2B. The input devices included in the input device region 212 can be changed to or remain in a deactivated state to, for example, save power of the computing device 200.

In some implementations, when the computing device 200 is in the tablet configuration, the display portion 220 of the computing device 200 can be translated with respect to the base portion 210 of the computing device 200. For example, the display portion 220 of the computing device 200 can be translated along direction A1 shown in FIG. 2A to the position shown in FIG. 2B.

FIG. 2B is a diagram that illustrates the display portion 220 of the computing device 200 in a partial tablet configuration. The display portion 220, when the computing device 200 is in the tablet configuration shown in FIG. 2A, can be translated along the guides 240, 241 in the direction A1 so that at least a portion of the top portion 228 of the display portion 220 is no longer disposed over the base portion 210 of the computing device 200 as shown in FIG. 2B. In this implementation, when the display portion 220 is translated along the guides 240 in the direction A1, at least a portion of the input device region 212 is exposed. In some implementations, the display portion 220 can be translated along the guides 240 in direction A2 from the configuration shown in FIG. 2B to the tablet configuration shown in FIG. 2B.

In some implementations, one or more input devices (or portions thereof) included in the input device region 212 and/or touch sensitivity of the touch sensitive display 222 can be activated or deactivated when the display portion 220 of the computing device 200 is translated along the guides 240 beyond a specified point. Also, in some implementations, multiple input devices included in the input device region 212 and/or touch sensitivity of the touch sensitive display 222 can be activated or deactivated in a staggered fashion as the display portion 220 of the computing device 200 is translated along the guides 240 along direction A1 or direction A2.

In some implementations, when the computing device 200 is in the configuration shown in FIG. 2B, an input device exposed within the input device region 212 can include, for example, a keyboard and/or a touchpad device (and associated selection buttons). In some implementations, the input device region 212 can include various types of input devices such as, for example, a keyboard, one or more buttons (e.g., volume control buttons, arrow buttons, power buttons, functional keys, wireless communication activation/deactivation buttons), an electrostatic touchpad (which can be associated with one or more select buttons) to control a mouse cursor, etc.

When the computing device 200 is in the configuration shown in FIG. 2B, only a keyboard (and not a touchpad device) may be exposed. In such implementations, if the keyboard is a virtual keyboard, the virtual keyboard can be configured to virtually rotate depending on the orientation of the computing device 200 with respect to a user and/or the touch sensitive display 222.

FIG. 2C illustrates the computing device 200 shown in FIG. 2A in a laptop configuration. As shown in FIG. 2C, when the computing device 200 is in the laptop configuration, the display portion 220 of the computing device 200 is distal to the input device region 212 of the base portion 210 and a plane (e.g., primary plane) of the display portion 220 is non-parallel to a plane (e.g., plane P2 shown in FIG. 2A, a primary plane) of the base portion 210.

In some implementations, one or more input devices included in the input device region 212 can be in an activated state when the computing device 200 is in (or moved to) the laptop configuration shown in FIG. 2C. Also, in some implementations, touch sensitivity of the touch sensitive display 222 can be in a deactivated state (or changed to a deactivated state) when the computing device 200 is in (or moved to) the laptop configuration shown in FIG. 2C. In such implementations, the one or more input devices included in the input device region 212 can be the primary input device(s) of the computing device 200 when the computing device 200 is in the laptop configuration. In some implementations, if touch sensitivity of the touch sensitive display 222 is in a deactivated state (or changed to a deactivated state) when the computing device 200 is in (or moved to) the laptop configuration, touch sensitivity of the touch sensitive display 222 can be manually activated (e.g., manually activated using an input device included in the input device region 212) when the computing device 200 is in (or moved to) the laptop configuration.

In some implementations, one or more input devices (or portions thereof) included in the input device region 212 and/or touch sensitivity of the touch sensitive display 222 can be activated automatically or deactivated automatically as the computing device 200 is being moved to the laptop configuration. For example, one or more input devices (or portions thereof) included in the input device region 212 can be activated when moved from the tablet configuration shown in FIG. 2A to the laptop configuration shown in FIG. 2C (if the input device(s) (or portions thereof) are in a deactivated state when in the tablet configuration). Also, touch sensitivity of the touch sensitive display 222 can be deactivated when the computing device 200 is moved from the tablet configuration shown in FIG. 2A to the laptop configuration shown in FIG. 2C (if touch sensitivity of the touch sensitive display 222 is in an activated state when in the tablet configuration).

In some implementations, one or more input devices (or portions thereof) included in the input device region 212 and/or touch sensitivity of the touch sensitive display 222 can be activated or deactivated when the display portion 220 of the computing device 200 is translated along the guides 240 beyond a specified point. For example, a keyboard included in the input device region 212 can be in a deactivated state when in the tablet configuration shown in FIG. 2A. Conversely, the keyboard can be deactivated (e.g., changed from a deactivated state to an activated state) when the display portion 220 is moved from the laptop configuration shown in FIG. 2C beyond a point in direction A2 along the guides 240 to the tablet configuration shown in FIG. 2A.

In some implementations, for example, a switch (not shown), or other device, can be triggered to activate or deactivate one or more input devices (or portions thereof) included in the input device region 212 and/or touch sensitivity of the touch sensitive display 222 when moved between various configurations. In some implementations, the switch can be, for example, an electronic switch, a mechanical switch (e.g., a mechanical relay), and/or so forth. In some implementations, the switch can include one or more sensors (e.g., electrical sensors) configured to detect one or more positions of portions of the computing device 200. For example, movement to a specified point (e.g., a position at the distal end and/or a position at proximal end of one or more of the guides 240, 241, a specified rotational position of the display portion 220 with respect to the base portion 210), beyond a location, and/or so forth, can be detected using a mechanical switch that can be actuated, an electrical contact, and/or so forth.

In some implementations, multiple input devices included in the input device region 212 and/or touch sensitive capability of the touch sensitive display 222 can be activated or deactivated in a staggered fashion (e.g., a staged fashion) as the display portion 220 of the computing device 200 is translated along the guides 240. For example, a keyboard and an electrostatic touchpad device for a mouse, which are included in the input device region 212, can be in a deactivated state when in the tablet configuration shown in FIG. 2A. The touch sensitivity of the touch sensitive display 222 can be in an activated state when in the tablet configuration shown in FIG. 2A. The electrostatic touchpad device can be activated (e.g., changed from a deactivated state to an activated state) when the display portion 220 is moved from the easel configuration shown in FIG. 2A beyond a first point along the guides 240 in direction A1 to the laptop configuration shown in FIG. 2C. The keyboard can be activated (e.g., changed from a deactivated state to an activated state) and touch sensitivity of the touch sensitive display 222 can be deactivated (e.g., changed from an activated state to a deactivated state) when the display portion 220 is moved from the easel configuration shown in FIG. 2A beyond a second point (different from the first point) along the guides 240 in direction A1 to the laptop configuration shown in FIG. 2C.

FIG. 2E illustrates the computing device 200 in a closed configuration. The display portion 220 shown in FIG. 2D can be rotated in the counterclockwise direction X until the display portion 220 is parallel to the base portion 210 (or substantially parallel) and the display surface 224 is facing towards the base portion 210 and moved to the closed configuration shown in FIG. 2E. Thus, the display portion 220 and the base portion 210 can be aligned along a common plane (or different planes that are parallel (or substantially parallel) to one another) with the display surface 224 facing towards the base portion 210. The display surface 224 is not accessible when the computing device 200 is in the closed configuration.

When in the closed configuration shown in FIG. 2E, the touch sensitive display 222 and one or more input devices included in the input device region 212 (both of which are not shown in FIG. 2E) may be deactivated (e.g., changed from an activated state to a deactivated state) because neither the touch sensitive display 222 nor any input devices included in the input device region 212 are accessible (e.g., readily accessible by a user) when the computing device 200 is in the closed configuration. In some implementations, the entire computing device 200 (e.g., processing components of the computing device 200) can be changed to a deactivated state. In some implementations, when the computing device 200 is moved to the closed configuration, one or more input devices included in the input device region 212 (which is not visible in FIG. 2B because the input device region 212 is covered by the display portion 220) and/or the touch sensitive display 222 can be deactivated (e.g., disabled, changed to a non-operational state, changed to a standby state). For example, a keyboard included in the input device region 212 and/or the touch sensitive display 222 can be automatically deactivated when the computing device 200 is in (or moved to) the closed configuration. Input devices included in the input device region 212 may be deactivated because the input devices may not be accessible when covered by the display portion 220 when the computing device 200 is in the closed configuration shown in FIG. 2B. The touch sensitive display 222 may be deactivated because the touch sensitive display 222 may not be accessible when the touch sensitive display 222 is facing the base portion 210 when the computing device 200 is in the closed configuration shown in FIG. 2B. The input devices included in the input device region 212 and/or the touch sensitive display 222 can be changed to or remain in a deactivated state to, for example, save power of the computing device 200.

In some implementations, when the computing device 200 is in the closed configuration, the display portion 220 of the computing device 200 can be translated with respect to the base portion 210 of the computing device 200. For example, the display portion 220 of the computing device 200 can be translated along the guides 240 (not shown in FIG. 2E) in direction A2.

Although not shown, for example, a latch (or similar device) can be attached to the top portion 228 of the display portion 220. When the computing device is moved to the closed configuration shown in FIG. 2E, the latch can be coupled (e.g., releasably coupled) to the front end 216 of the base portion 210 of the computing device 200 so that the display portion 220 may not be translated (in a direction opposite direction A1) with respect to the base portion 210. In some implementations, the latch can be configured so that the display portion 220 may be translated when the latch is released. In some implementations, the latch can also be configured (e.g., configured as a reversible latch, configured as a two-sided latch) so that when the computing device is moved to the tablet configuration shown in FIG. 2A, the latch can be coupled (e.g., releasably coupled) to the back end 218 of the base portion 210 of the computing device 200 so that the display portion 220 may not be translated (e.g., inadvertently translated) with respect to the base portion 210. In some implementations, a latch can be used to couple the top portion 228 of the display portion 220 to the front end 216 of the base portion 210 when the computing device 200 is in the closed configuration, and a separate latch can be used to couple the top portion 228 of the display portion 220 to the back end 216 of the base portion 210 when the computing device 200 is in the tablet configuration.

FIGS. 3A through 3F are diagrams that illustrate a clutch mechanism 380 of a computing device 300 in various configurations. The computing device 300 includes a display portion 320 and a base portion 310, which includes a guide 340. The clutch mechanism 380 can be a clutch mechanism used in the computing devices shown in FIGS. 1 and 2A through 2E.

Figure 3A:
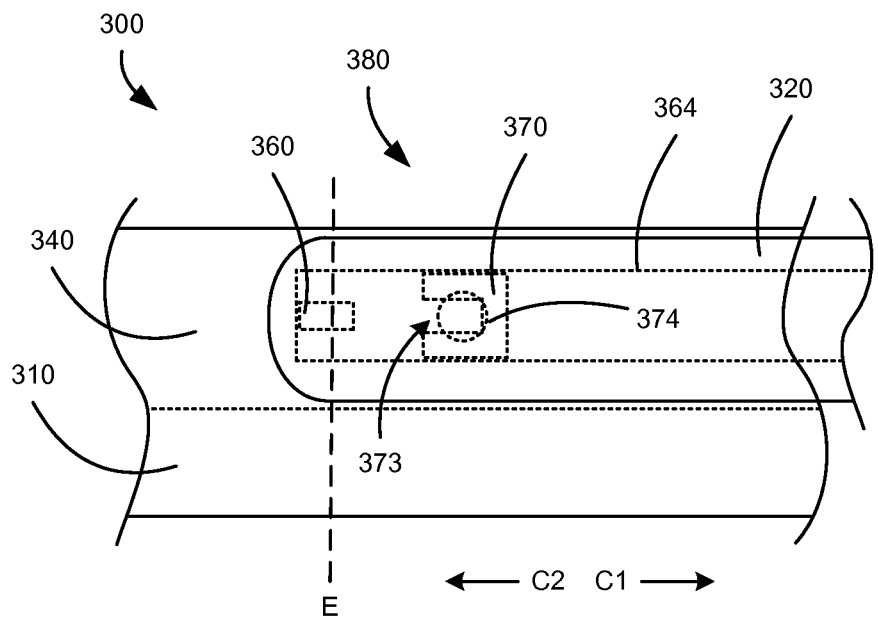
FIGS. 3A through 3F are diagrams that illustrate a clutch mechanism of a computing device in various configurations.

The configuration of the clutch mechanism 380 shown in FIG. 3A can correspond with a configuration of the clutch mechanism of the computing device 200 between FIGS. 2A and 2B. The configuration of the clutch mechanism 380 shown in FIG. 3B can correspond with a configuration of the clutch mechanism of the computing device 200 shown in FIG. 2B. The configuration of the clutch mechanism 380 shown in FIG. 3C can correspond with a configuration of the clutch mechanism of the computing device 200 when the computing device 200 is in the laptop configuration shown in FIG. 2B. The configuration of the clutch mechanism 380 shown in FIG. 3D can correspond with a configuration of the clutch mechanism of the computing device 200 shown in FIG. 2D. The configuration of the clutch mechanism 380 shown in FIG. 3E can correspond with a configuration of the clutch mechanism of the computing device 200 between FIGS. 2D and 2E.

As shown in FIG. 3A, the clutch mechanism 380 includes a base coupling mechanism 370 having at least a portion disposed in or coupled to the guide 340 of the base portion 310 of the computing device 300. In some implementations, the base coupling mechanism 370 can be coupled to the base portion 310 of the computing device 300. In some implementations, the base coupling mechanism 370 can be fixedly coupled to a portion (e.g., the guide 340), or along a portion, of the base portion 310 of the computing device 300. In other words, the base coupling mechanism 370 can be coupled at a fixed location (e.g., a fixed horizontal location) along the base portion 310 of the computing device 300.

The clutch mechanism 380 also includes a display coupling mechanism 360 coupled to the base portion 310 of the computing device 300. The display coupling mechanism 360 can have at least a portion disposed in, or coupled to, the display portion 320 of the computing device 300. In some implementations, the display coupling mechanism 360 can be fixedly coupled (e.g., fixedly coupled along a horizontal location) to at least a portion of the display portion 320 of the computing device 300. In other words, the display coupling mechanism 360 can be coupled at a fixed location along the display portion 320 of the computing device 300. Accordingly, when the display portion 320 is slidably moved with respect to the base portion 310, the display coupling mechanism 360 is also moved with respect to the base portion 310 of the computing device 300 and/or the base coupling mechanism 370.

The display portion 320 includes a slot 364 within which the base coupling mechanism 370 can slidably move. FIG. 3F, which is a cross-sectional view cut along line E of FIG. 3A, is a diagram that illustrates the base coupling mechanism 370 disposed within at least a portion of the slot 364. As shown in FIG. 3F, the display coupling mechanism 360 is also at least partially disposed within the slot 364. As shown in FIG. 3F, the base coupling mechanism 370, in this implementation, is coupled to the guide 340 via a rotating portion 374.

The display portion 320 is configured to be slidably moved with respect to the base portion 310 along direction C1 or direction C2. For example, as illustrated in FIG. 3A, when the display portion 320 is slidably moved along direction C1, the display coupling mechanism 360 is moved toward the base coupling mechanism 370, and the base coupling mechanism 370 is slidably moved within the slot 364. When the display portion 320 is slidably moved along direction C2, the display coupling mechanism 360 is moved away from the base coupling mechanism 370 and the base coupling mechanism 370 is slidably moved within the slot 364.

Figure 3B:
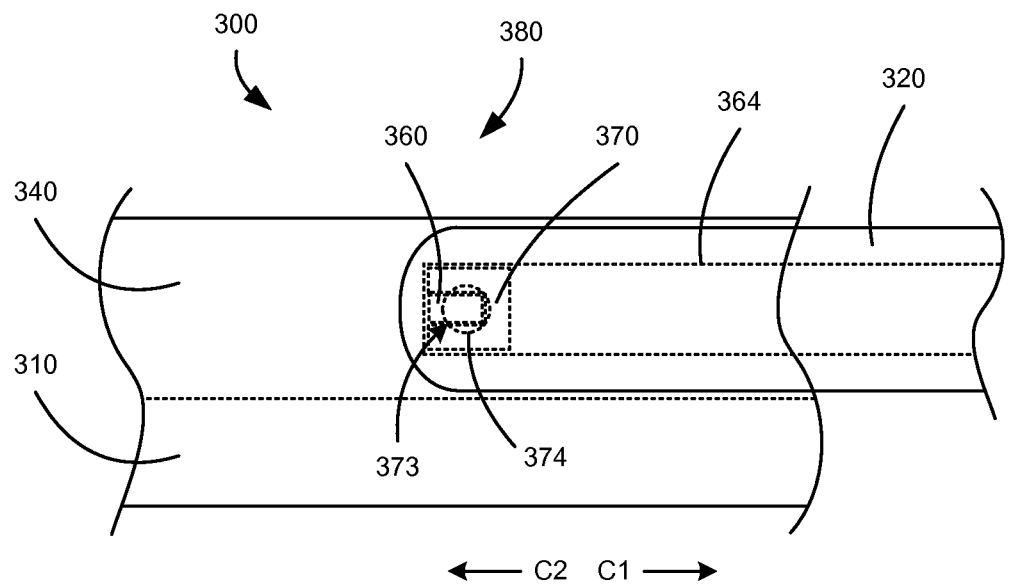

When the display portion 320 is slidably moved with respect to the base portion 310 along direction C1, the display coupling mechanism 360 is moved into, or coupled to, the base coupling mechanism 370 as shown in FIG. 3B. When the display coupling mechanism 360 is coupled to the base coupling mechanism 370, the display portion 320 can be rotatably moved using the rotating portion 374 in a clockwise direction D1 or a counterclockwise direction D2. The display portion 320 is rotatably moved in the clockwise direction D1 from the configuration shown in FIG. 3B to the configuration shown in FIG. 3C. The display portion 320 can be rotatably moved in the counterclockwise direction D2 from the configuration shown in FIG. 3C to the configuration shown in FIG. 3D.

As shown in FIG. 3B, the display coupling mechanism 360 is moved into a cavity 373 of the base coupling mechanism 370. In some implementations, the cavity 373 can be included in at least a portion of the rotating portion 374. Although not shown in FIGS. 3A through 3F, in some implementations, the display coupling mechanism 360 can include one or more recesses and the base coupling mechanism 370 can include one or more protrusions configured to be moving into the one or more recesses of the display coupling mechanism 360.

Figure 3C:
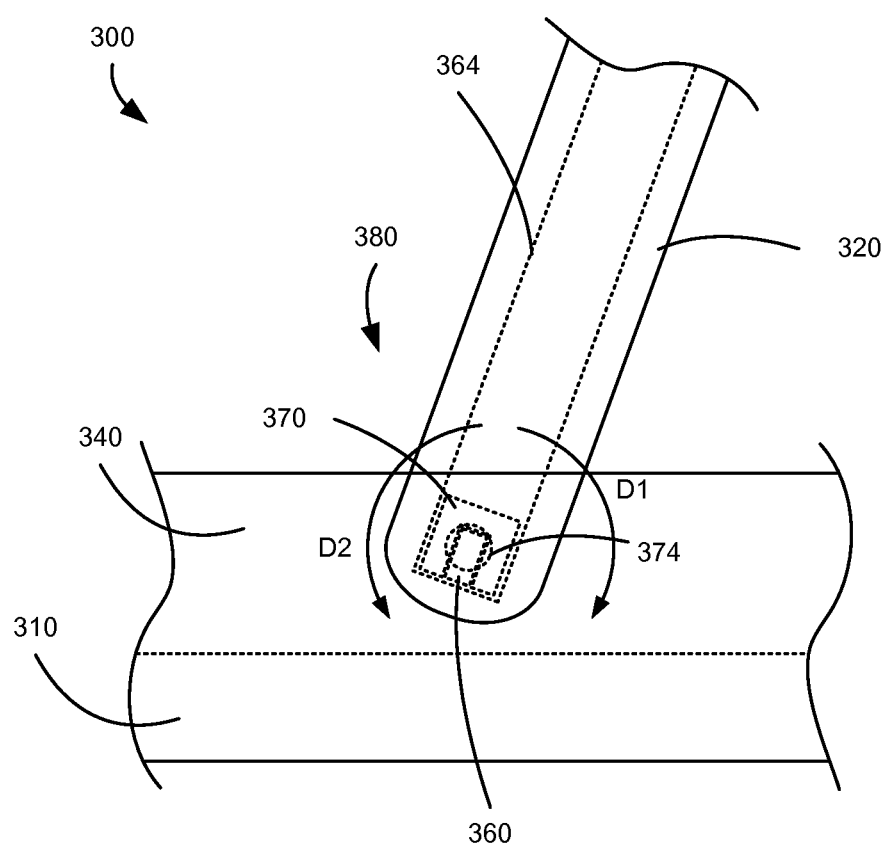
Figure 3D:
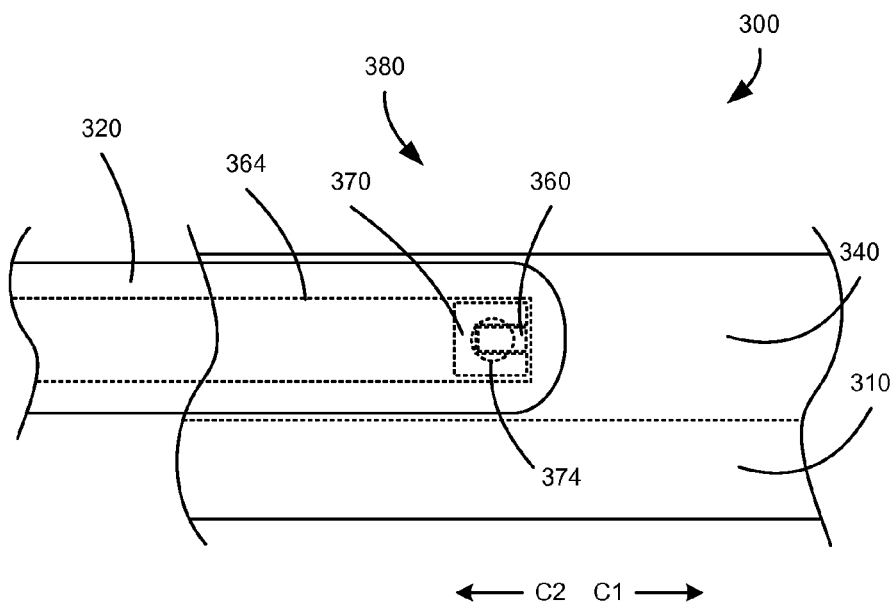
Figure 3E:
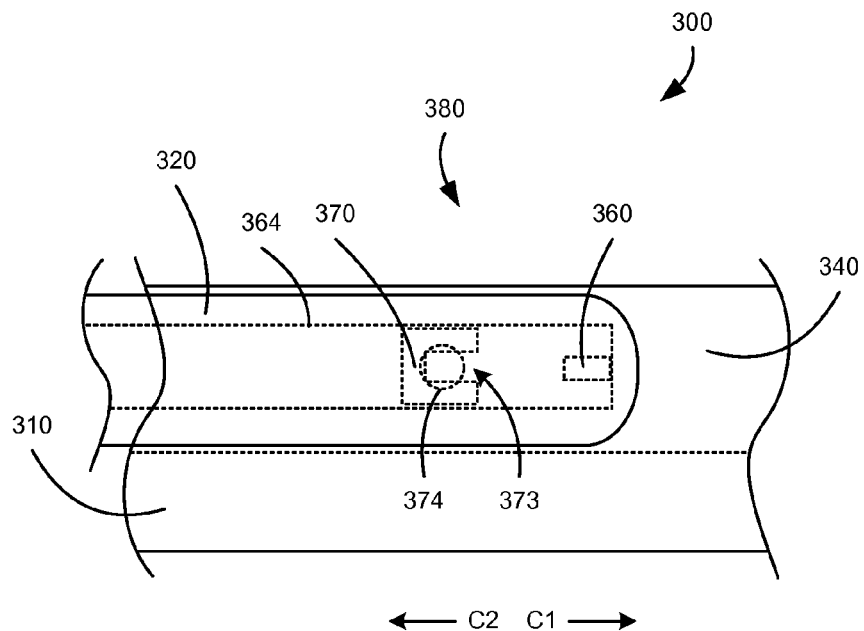
Figure 3F:
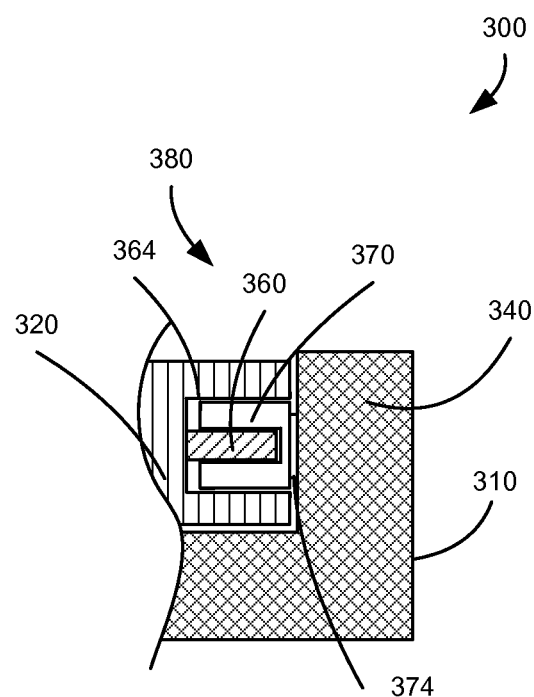

The display portion 320 can rotatably moved in the clockwise direction D1 from the configuration shown in FIG. 3C to the configuration shown in FIG. 3D. When in the configuration shown in FIG. 3B, the display portion 320 can be slidably moved with respect to the base portion 310 along direction C1 until the display coupling mechanism 360 is moved out of, or decoupled from, the base coupling mechanism 370 as shown in FIG. 3E. Similarly, the display portion 320 can be slidably moved with respect to the base portion 310 along the direction C2 until the display coupling mechanism is moved into, or coupled to, the base coupling mechanism 370 as shown in FIG. 3D.

Figure 4A:
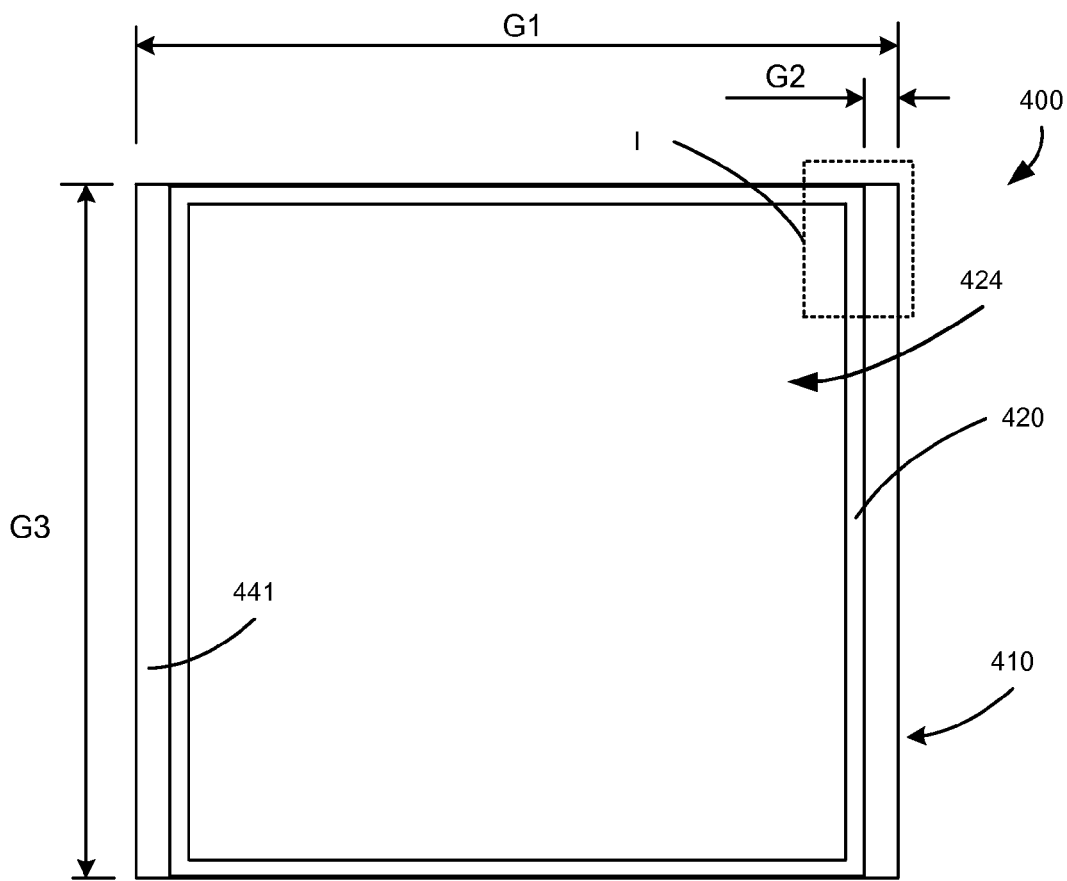

FIG. 4A is a diagram that illustrates a top view of a computing device 400 including a clutch mechanism 480 (shown in FIG. 4D). As shown in FIG. 4A, the computing device 400 includes a display portion 420 disposed between guides 440, 441 of a base portion 410 of the computing device 400. The computing device 400 is in a tablet configuration with a display surface 424 facing away from the base portion 410.

In some implementations, the guide 440 (and/or guide 441) can have a width G2 of between 5 to 30 mm. In some implementations, the width G2 can be less than 5 mm or greater than 30 mm. In some implementations, the width G2 can be more than 10 times smaller than width G1. In some implementations, width G3 can be greater than, equal to, or smaller than width G1. In some implementations, the width G1 and/or the width G3 can be between 20 cm to 40 cm. In some implementations, the width G1 and/or the width G3 can be less than 20 cm or greater than 40 cm.

Figure 4B:
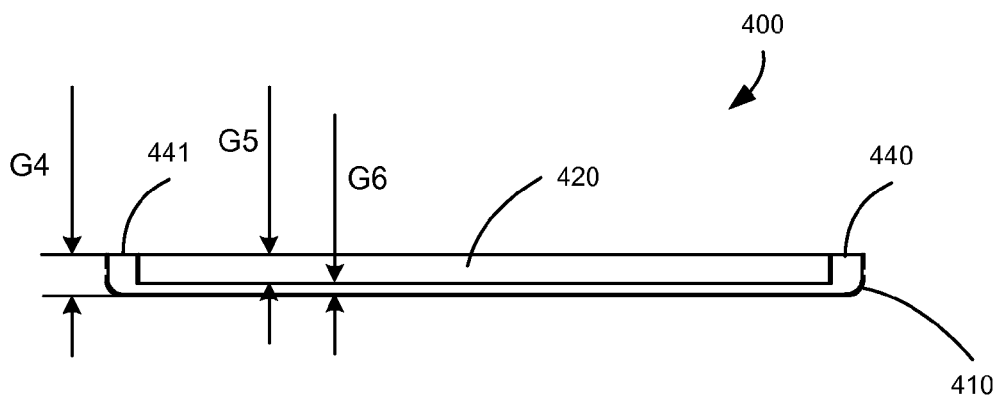

FIG. 4B is a diagram that illustrates a front view of the computing device 400 shown in FIG. 4A. As shown in FIG. 4B, the computing device 400 has a thickness G4. In some implementations, the thickness G4 can be between 10 to 30 mm. In some implementations, the thickness G4 can be less than 10 mm or greater than 30 mm.

As shown in FIG. 4B, the thickness G4 is approximately equal to a combination of a thickness G5 of the display portion 420 and a thickness G6 of the base portion 410. In this implementation, the thickness G5 of the display portion 420 is greater than the thickness G6 of the base portion 410. In some implementations the thickness G5 of the display portion 420 can be more than 2 times greater than the thickness G6 of the base portion 410. In some implementations the thickness G5 of the display portion 420 can be less than 2 times greater than the thickness G6 of the base portion 410.

Figure 4C:
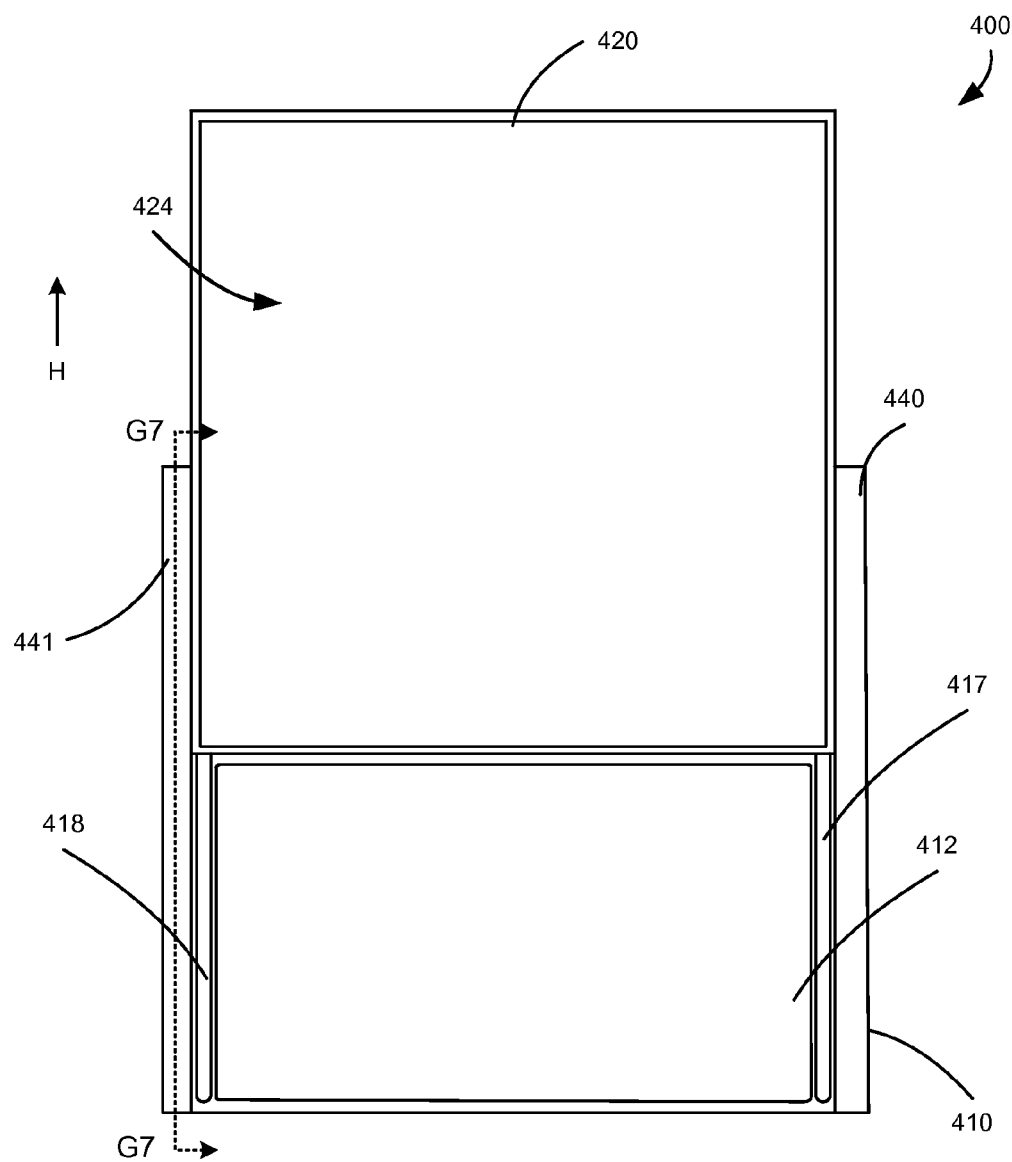

FIG. 4C is a diagram that illustrates a top view of the computing device 400 with the display portion 420 slidably moved along direction H with respect to the base portion 410. As shown in FIG. 4C, an input device region 412 is exposed when the display portion 420 is slidably moved along direction H.

As shown in FIG. 4C, sliding members 417, 418 can be coupled to the base portion 410. The sliding members 417, 418 can facilitate sliding movement of the display portion 420 with respect to the base portion 410. The sliding members 417, 418 are disposed, respectively, on each side of the input device region 412. In some implementations, the sliding members 417, 418 can be made of, for example, a plastic material such as Teflon. In some implementations, more or less sliding members than those shown can be coupled to the base portion 410. In some implementations, one or more of the sliding members 417, 418 can be disposed within one or more recesses in the base portion 410.

FIG. 4D is a diagram that illustrates the computing device cut along line G7 shown in FIG. 4C. As shown in FIG. 4D, at least a portion of the clutch mechanism 480 is disposed within the base portion 410 of the computing device 400. A slot 464 is included in at least a portion of the display portion 420.

FIG. 4E is a diagram that illustrates the base portion 410 of the computing device 400 without the display portion 420. A base coupling mechanism 481 of the clutch mechanism 480 and a base coupling mechanism 483 of the clutch mechanism 482 are shown in FIG. 4E. Also, additional sliding members 419, similar to, or the same as, the sliding members 417, 418, are shown in FIG. 4E.

FIG. 4F is a diagram that illustrates a zoomed-in portion I of the computing device 400 shown in FIG. 4A. As shown in FIG. 4F, the display portion 420 has a protrusion 427 with a length G8 and a width G9 that extends from a side of the display portion 420. The protrusion 427 can be configured to contact the guide 440 and so that the display portion 420 can be frictionally maintained in the tablet configuration shown in FIG. 4A. In some implementations, the width G9 of the protrusion 427 can be less than a few millimeters and the length G8 of the protrusion 427 can be a few millimeters or less.

FIGS. 5A through 5G are diagrams that illustrate various configurations and movement of components within a base coupling mechanism of a clutch mechanism 580. The clutch mechanism 580 is a more detailed view of the clutch mechanism 480 shown in FIG. 4D.

In this implementation, the clutch mechanism 580 includes multiple spring mechanisms configured to change or facilitate (e.g., decrease torque associated with, increase torque associated with) movement of a display portion 52 with respect to a base portion 51 of a computing device 50 within a specified range of angles. Specifically, the spring mechanisms are configured to change or facilitate (or apply a force during) movement of the display portion 52 with respect to the base portion 51 when the display portion 52 and the base portion 51 are at approximately an angle of 30° or less (when the computing device 50 is being opened or when the computing device 50 is being closed). In some implementations, clutch mechanisms can include spring mechanisms configured to facilitate movement between a different range of angles than shown in connection with FIGS. 5A through 5G. In some implementations, spring mechanisms can include various types of springs such as coil springs.

Figure 5A:
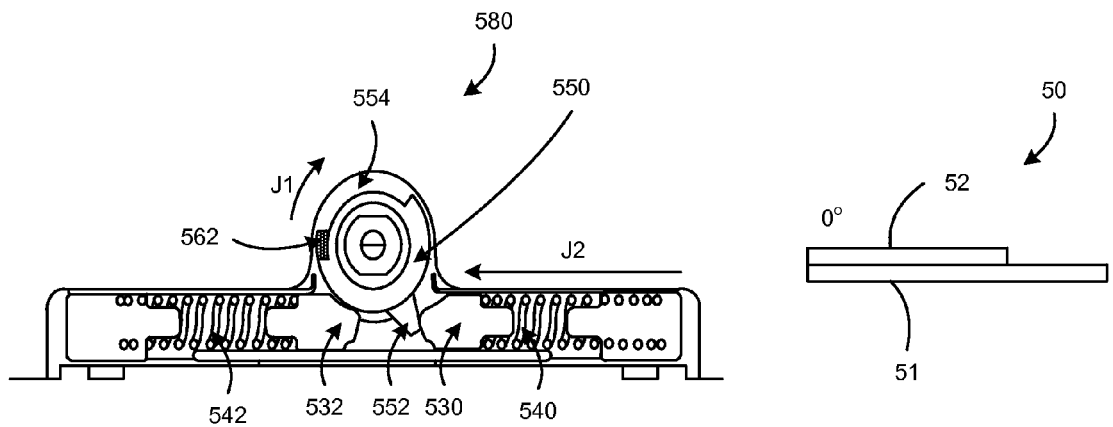
FIGS. 5A through 5G are diagrams that illustrate various configurations and movement of components within a base coupling mechanism of a clutch mechanism.
Figure 5B:
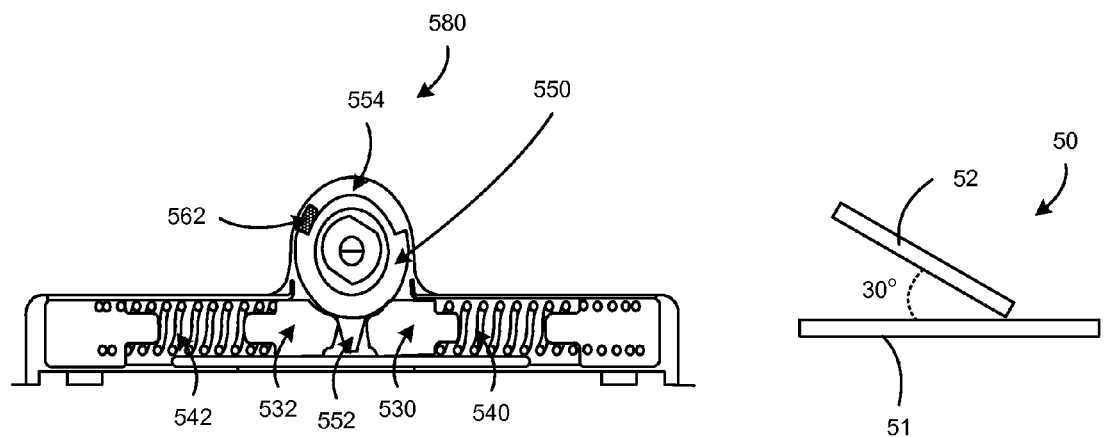

As shown in FIG. 5A, a cam washer 550 has a protrusion 552 configured to contact with a pushpin 530 when an angle between the display portion 52 and the base portion 51 of the computing device 50 is 0°. The pushpin 530 is coupled to a spring 540 (which is represented as a coil-type spring) configured to apply a force (along direction J2) and facilitate movement of (e.g., decrease opening torque) the display portion 52 as the display portion is moved along direction J1 from 0° with respect to the base portion 51 to an angle between the display portion 52 and the base portion 51 of the computing device 50 of 30° as shown in FIG. 5B. Specifically, the pushpin 530 is configured to apply a force to a protrusion 562 operably coupled to the display portion 52 to facilitate movement of the display portion 52. The protrusion 562 can be included in a display coupling mechanism (not shown), or can be caused to move by the display mechanism, and disposed within a recess 554 of the cam washer 550. The cam washer 550 is configured to rotate along direction J1 as the display portion 52 is rotate along direction J1.

As shown in FIG. 5B, the protrusion 552 of the cam washer 550 is disposed between and in contact with both pushpin 530 and pushpin 532 when the display portion 52 is at approximately a 30° angle with respect to the base portion 51.

Figure 5C:
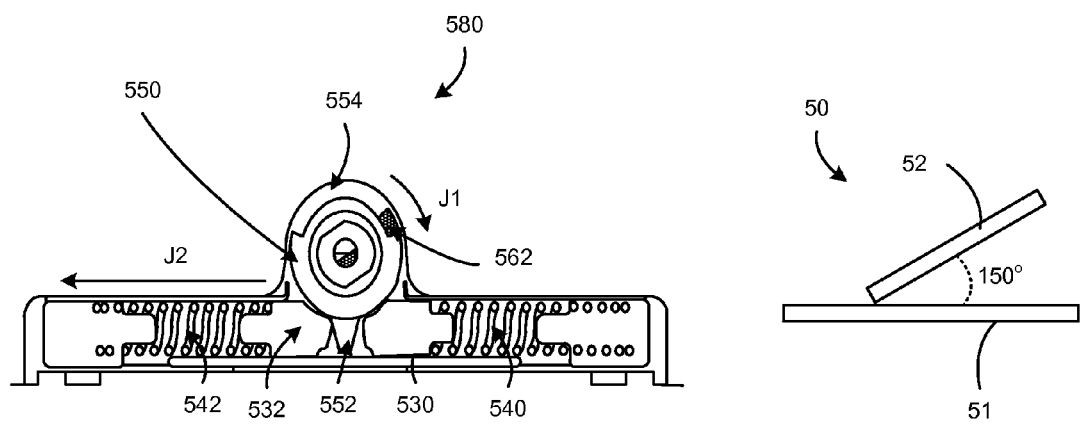

As the display portion 52 is moved between the 30° angle shown in FIG. 5B and a 150° angle shown in FIG. 5C, the protrusion 562 is configured to slidably move within the recess 554 of the cam washer 550. As the display portion 52 is moved between the 150° angle shown in FIG. 5C to the 180° angle (or 0° angle) the protrusion 562 is configured to come in contact with the cam washer 550 so that the protrusion 552 of the cam washer 550 contacts pushpin 532 to compress (along direction J2) the spring 542. Accordingly, the torque to move the display portion 52 from the 150° angle to the 180° angle is increased by the force applied by spring 542 via the pushpin 532. In some implementations, the spring 542 is included as part of a left-side spring mechanism of the clutch mechanism 580, and the spring 540 is included as part of a right-side spring mechanism of the clutch mechanism 580.

Figure 5D:
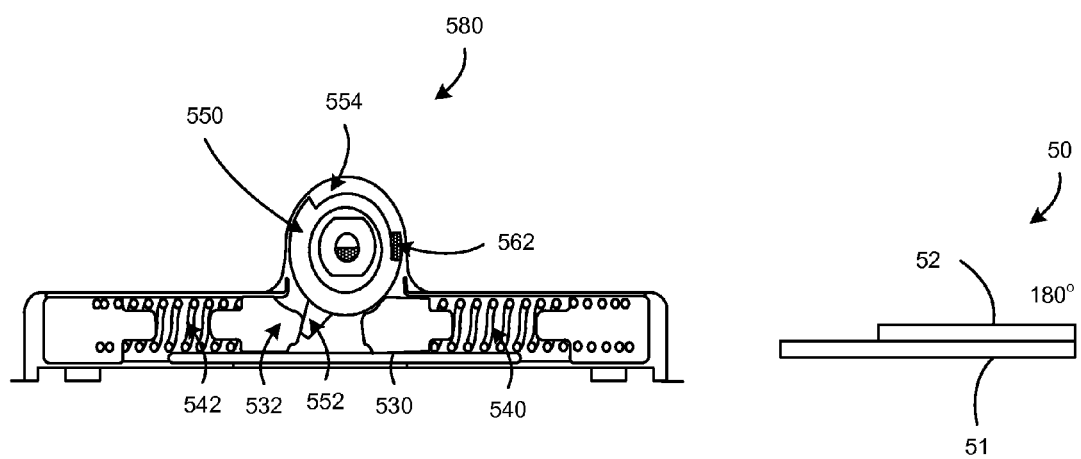
Figure 5E:
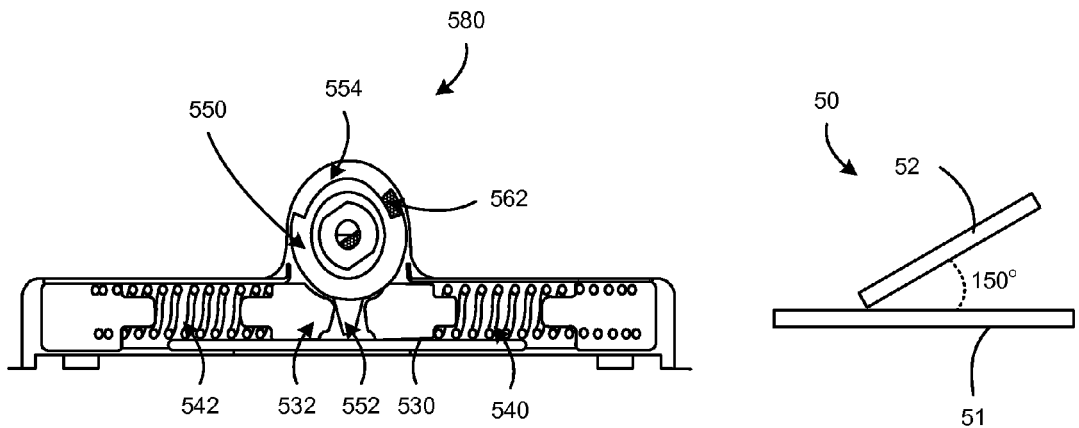
Figure 5F:
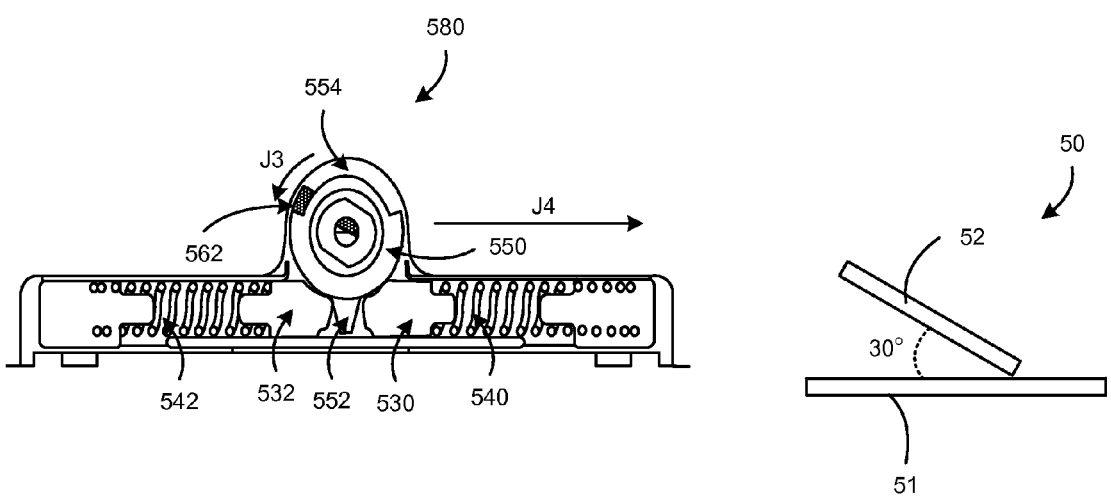
Figure 5G:
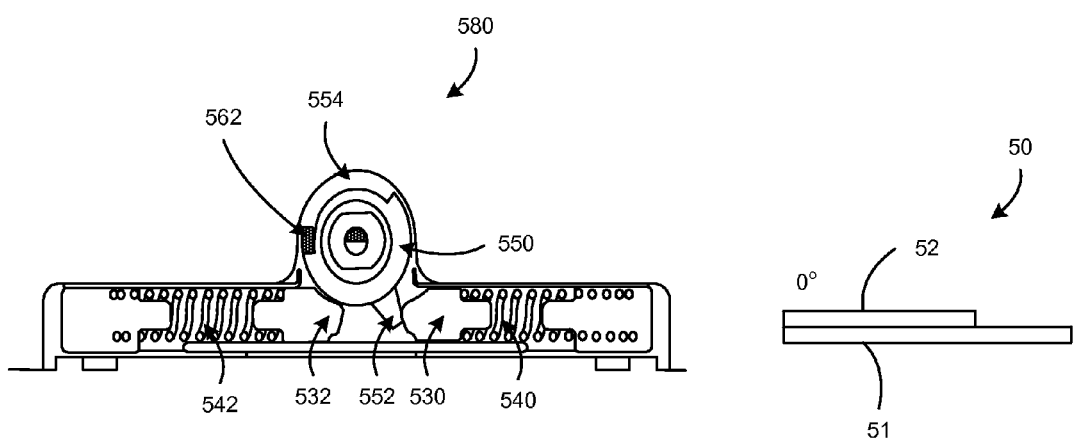

FIGS. 5E through 5G illustrate movement within the clutch mechanism 580 in the reverse direction from that shown in FIGS. 5A through 5C. Specifically, the display portion 52 can be moved from a 180° angle with respect to the base portion 51 is shown in FIG. 5D to a 150° angle shown in FIG. 5E. In this case, one moved from the 180° angle to the 150° angle, the torque is decrease. Corresponding movement within the clutch mechanism 580 as shown in FIG. 5E. Similarly, movement within the clutch mechanism 580 is shown in FIGS. 5F and 5G as the display portion 52 is moved with respect to the base portion 51 to a 0° angle as shown in FIG. 5G. The movement of the components within the clutch mechanism 580, and specifically, the force applied by the spring 540 causes an increase in torque as the display portion 52 is moved from the 30° angle to the 0° angle with respect to the base portion 51.

Although not shown in FIGS. 5A through 5G movement of the display portion 52 with respect to the base portion 51 can be asymmetric. For example, a first spring mechanism can be configured to facilitate movement of the display portion 52 with respect to the base portion 51 when the display portion 52 and the base portion 51 are at an angle of 30° or less. However, a second spring mechanism can be configured to facilitate movement of the display portion 52 with respect to the base portion 51 when the display portion 52 and the base portion 51 are at an angle of 20° or less.

FIG. 6 is a graph that illustrates torque with respect to angle for the clutch mechanism 580 shown in FIGS. 5A through 5G. Increasing torque is shown on the y-axis and angle is shown on the x-axis. Specifically, line 610 (dotted line with open squares) illustrates torque as the display portion 52 is moved with the respect to the base portion 51 as shown in FIGS. 5A through 5D. Line 620 (dashed line with solid triangles) illustrates torque as the display portion 52 is moved with the respect to the base portion 51 as shown in FIGS. 5E through 5G. Accordingly, the spring-actuated pushpins 530, 531 can be configured to apply a force (e.g., a force to the cam washer 550) within less than all of a range of rotation of the display coupling mechanism of the display portion 52.

Figure 7:
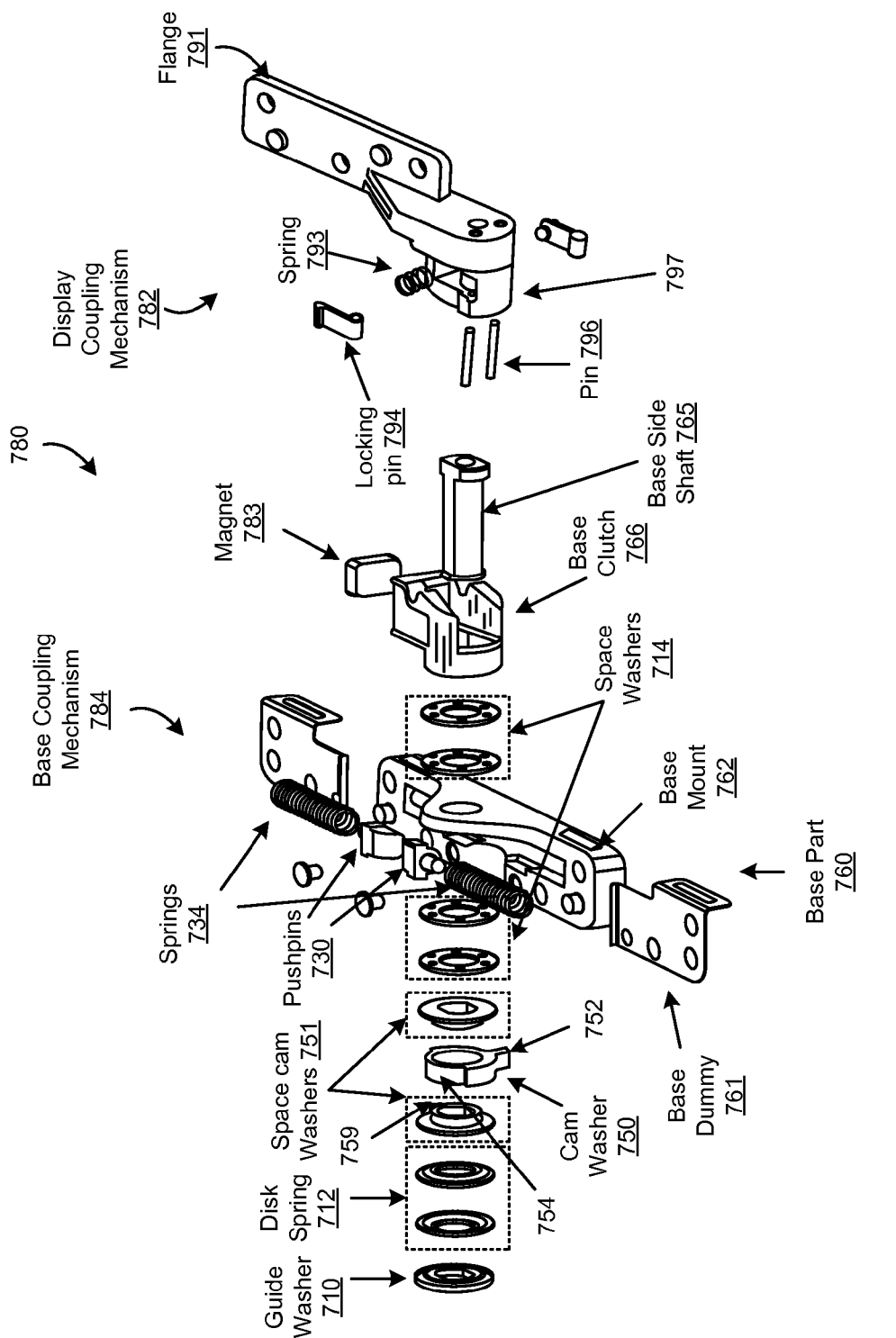
FIGS. 7 and 8 are exploded view diagrams that illustrate various components of clutch mechanisms.
Figure 8:
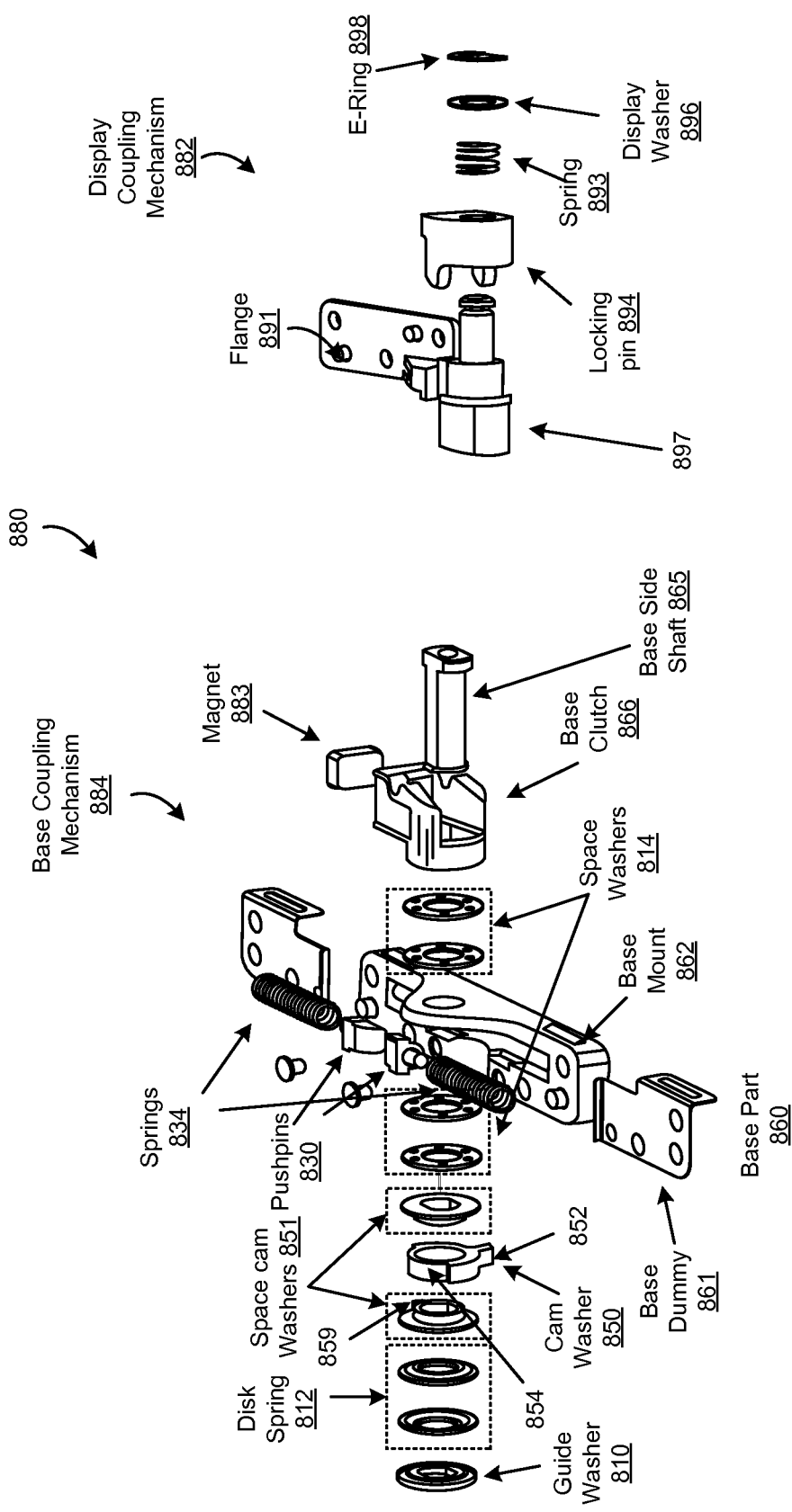

FIGS. 7 and 8 are exploded view diagrams that illustrate various components of clutch mechanisms. As shown in FIG. 7, a clutch mechanism 780 includes a display coupling mechanism 782 and a base coupling mechanism 784. The base coupling mechanism 784 includes a base mount 762 that can be coupled to at least a portion of the computing device. A base side shaft 765 can be used to rotatably couple (as a rotating portion) many of the components of the base coupling mechanism 784 together. As shown in FIG. 7, the base coupling mechanism 784 includes at least a guide washer 710, a disk spring 712, space cam washer 751, and space washers 714. The cam washer 750, which includes a protrusion 752, can be disposed between pushpins 730 coupled to springs 734. The cam washer 750 also has a recess 754, and at least one of the space cam washers includes a protrusion 759 configured to move within the recess 754.

As shown in FIG. 7, the base coupling mechanism 784 includes a base clutch 766 through which the base side shaft 765 can be inserted. A magnet 783 can be coupled to (e.g., optionally coupled to) the base clutch 766. The magnet 783 is configured to facilitate coupling of the display coupling mechanism 782 to the base clutch 766 of the base coupling mechanism 784. The base coupling mechanism 784 can be configured to be coupled to the display coupling mechanism 782. Specifically, at least a portion (e.g., portion 797) of the display coupling mechanism 782 can be inserted into an opening of the base clutch 766. In some implementations, the base clutch 766, and/or portions coupled to the base clutch 766, can be referred to as a rotating receiver.

As shown in FIG. 7, the display coupling mechanism 782 includes a flange 791 that can be coupled to at least a portion of a display portion of a computing device. In this implementation, the display coupling mechanism 782 includes a locking pin 794 rotatably coupled to the display coupling mechanism 782 via at least one pin 796. A spring 793 is configured to apply a force to the locking pin 794. The locking pin 794 can be configured to maintain a coupling of the display coupling mechanism 782 to the base clutch 766 of the base coupling mechanism 784. In some implementations, various types of latch members such as the locking pin 794 can be used to removably couple, or to lockably couple, the display coupling mechanism 782 to the base coupling mechanism 784.

As shown in FIG. 8, a clutch mechanism 880 includes a display coupling mechanism 882 and a base coupling mechanism 884. The base coupling mechanism 884 includes a base mount 862 that can be coupled to at least a portion of a base portion of the computing device. A base side shaft 865 can be used to rotatably couple (as a rotating portion) many of the components of the base coupling mechanism 884 together. As shown in FIG. 8, the base coupling mechanism 884 includes at least a guide washer 810, a disk spring 812, space cam washer 851, and space washers 814. The cam washer 850, which includes a protrusion 852, can be disposed between pushpins 830 coupled to springs 834. The cam washer 850 also has a recess 854, and at least one of the space cam washers includes a protrusion 859 configured to move within the recess 854.

As shown in FIG. 8, the base coupling mechanism 884 includes a base clutch 866 through which the base side shaft 865 can be inserted. A magnet 883 can be coupled to (e.g., optionally coupled to) the base clutch 866. The magnet 883 is configured to facilitate coupling of the display coupling mechanism 882 to the base clutch 866 of the base coupling mechanism 884. The base coupling mechanism 884 can be configured to be coupled to the display coupling mechanism 882. Specifically, at least a portion (e.g., portion 897) of the display coupling mechanism 882 can be inserted into an opening of the base clutch 866. In some implementations, the base clutch 866, and/or portions coupled to the base clutch 866, can be referred to as a rotating receiver.

As shown in FIG. 8, the display coupling mechanism 882 includes a flange 891 that can be coupled to at least a portion of a display portion of a computing device. In this implementation, the display coupling mechanism 882 includes a locking pin 894 rotatably coupled to the display coupling mechanism 882. A spring 893 is configured to apply a force to the locking pin 894. The locking pin 894 can be configured to maintain a coupling of the display coupling mechanism 882 to the base clutch 866 of the base coupling mechanism 884. In some implementations, various types of latch members such as the locking pin 894 can be used to removably couple, or to lockably couple, the display coupling mechanism 882 to the base coupling mechanism 884. The display coupling mechanism 882 also includes a display washer 896 and an E-ring 898.

FIG. 9 is a diagram that illustrates a display coupling mechanism 982 coupled to a base coupling mechanism 984. As shown in FIG. 9, a portion 997 of the display coupling mechanism 982 can be inserted (along direction M1) into a base clutch 966 of the base coupling mechanism 984. In this diagram, the portion 997 of the display coupling mechanism 982 is only partially inserted into the base clutch 966 of the base coupling mechanism 984.

FIGS. 10A through 10C are diagrams that illustrate a base clutch 1066 coupled to a portion 1097 of a display coupling mechanism 1082. FIG. 10A illustrates a perspective view of the portion 1097 of the display coupling mechanism 1082 having at least a portion inserted into the base clutch 1066. FIG. 10B illustrates a cross-sectional view of the diagram shown in FIG. 10A cut along the line V. As shown in FIG. 10B locking pins 1094 can come in contact with an inner cavity 1068 of the base clutch 1066 as the portion 1097 of the display coupling mechanism 1082 is moved along direction W1. FIG. 10C illustrates protrusions of the locking pins 1094 disposed within the recesses 1067 of the inner cavity 1068 of the base clutch 1066 after the portion 1097 of the display coupling mechanism 1082 is moved along direction W1. In this implementation, a spring 1093 is configured to lockably couple (in a reversible coupling fashion) the portion 1097 of the display coupling mechanism 1082 to the base clutch 1066 via the locking pins 1094

Figure 11:
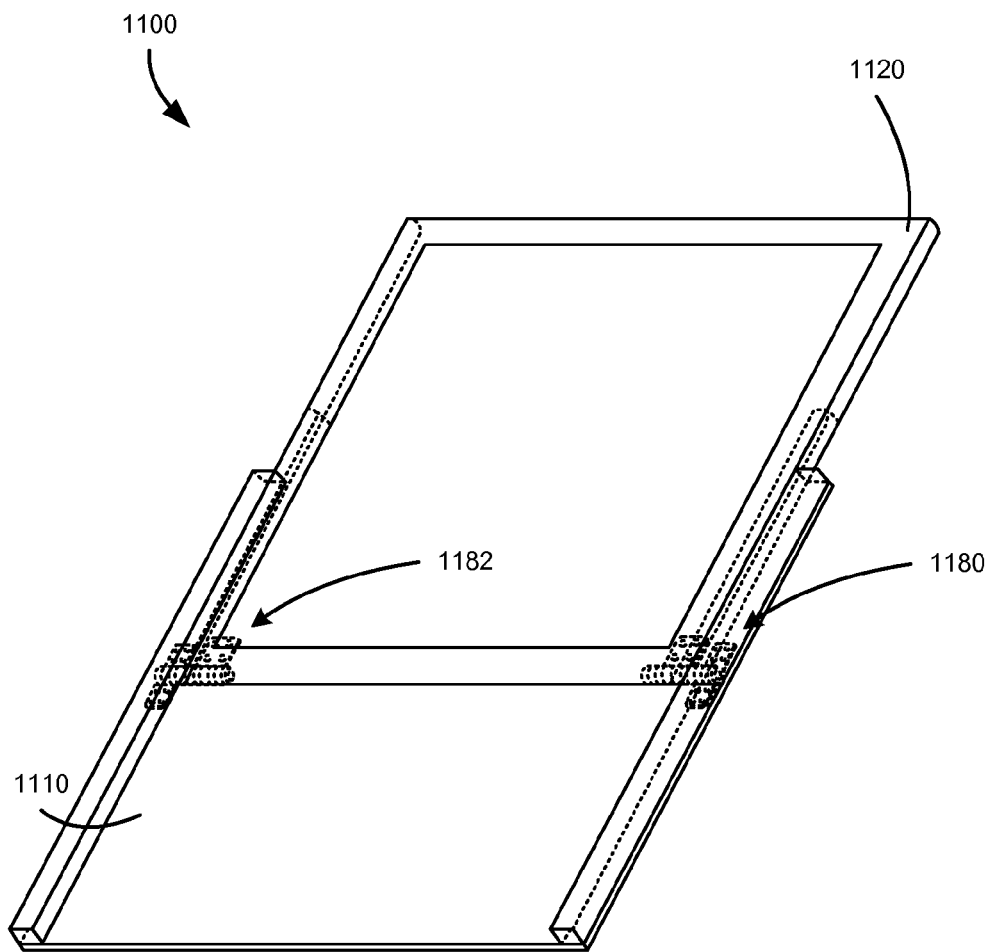
FIG. 11 is a diagram of a computing device that includes clutch mechanisms.

FIG. 11 is a diagram of a computing device 1100 that includes clutch mechanisms 1180, 1182. As shown in FIG. 11, the clutch mechanisms 1180, 1182 each have portions that are respectively coupled to a base portion 1110 of the computing device and a display portion 1120 of the computing device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device, comprising:
a base portion including a keyboard and a base coupling mechanism fixedly coupled to the base portion, the base coupling mechanism including a rotating receiver configured to rotate with respect to the base portion; and a display portion having a display coupling mechanism configured to be removably coupled to the rotating receiver of the base coupling mechanism and including a slot on a side of the display portion, the base coupling mechanism configured to be disposed within the slot on the side of the display portion, the display coupling mechanism of the display portion having at least a portion disposed within the slot on the side of the display portion and configured to be coupled to the rotating receiver of the base coupling mechanism in response to the display portion being slidably moved in a first direction with respect to the base portion via the slot such that a distal end of the display portion extends beyond a distal end of the base portion when:
a viewable surface on one side of the display portion is facing away from the base portion, and
the viewable surface and the slot are maligned along a plane substantially parallel to a plane along which the keyboard of the base portion is aligned, the display coupling mechanism configured to be decoupled from the rotating receiver of the base coupling mechanism in response to the display portion being slidably moved in a second direction with respect to the base portion via the slot when:
the viewable surface on the one side of the display portion is facing away from the base portion, and
the viewable surface and the slot are aligned along the plane substantially parallel to the plane along which the keyboard of the base portion is aligned, the display coupling mechanism of the display portion configured to be coupled to the rotating receiver of the base coupling mechanism in response to the display portion being slidably moved with respect to the base portion via the slot in the second direction opposite the first direction such that the distal end of the display portion extends beyond a proximal end of the base portion when the viewable surface on the one side of the display portion is facing toward the base portion and when the plane along which the viewable surface and the slot are aligned is substantially parallel to the plane along which the keyboard of the base portion is aligned, the display coupling mechanism of the display portion configured to be decoupled from the rotating receiver of the base coupling mechanism in response to the display portion being slidably moved with respect to the base portion via the slot in the first direction when the viewable surface on the one side of the display portion is facing toward the base portion and when the plane along which the viewable surface and the slot are aligned is substantially parallel to the plane along which the keyboard of the base portion is aligned, the display portion configured to rotate via the rotating receiver when the display coupling mechanism is coupled to the rotating receiver of the base coupling mechanism.

2. The computing device of claim 1, wherein the rotating receiver includes a cavity, at least a portion of the display coupling mechanism is configured to be inserted into the cavity of the rotating receiver.

3. The computing device of claim 1, wherein the display portion is configured to slidably move with respect to the base portion in a translational direction orthogonal to an axis around which the display portion rotates when the display coupling mechanism of the display portion is coupled to the rotating receiver of the base coupling mechanism.

4. The computing device of claim 1, further comprising:
a guide included in the base portion, the display portion is configured to slidably move with respect to the base portion along the guide.

5. The computing device of claim 1, wherein the display portion is prevented from slidably moving with respect to the base portion when the display coupling mechanism of the display portion is coupled to the rotating receiver of the base coupling mechanism.

6. The computing device of claim 1, wherein the display portion is prevented from rotating with respect to the base portion when the display coupling mechanism of the display portion is decoupled from the rotating receiver of the base coupling mechanism.

7. The computing device of claim 1, wherein the display portion is configured rotate 180 degrees from a first position where the viewable surface of the display portion is facing toward the base portion to a second position where the viewable surface of the display portion is facing away from the base portion.

8. The computing device of claim 1, further comprising:
a cam washer operably coupled to the rotating receiver; and
a spring-actuated pushpin configured to apply a force to the cam washer within less than all of a range of rotation of the display coupling mechanism of the display portion.

9. An apparatus, comprising:
a base coupling mechanism configured to be fixedly coupled to a base portion of a computing device, the base coupling mechanism including a rotating receiver configured to rotate with respect to the base portion, a first pushpin actuated by a first spring, and a second pushpin actuated by a second spring, the second pushpin is disposed between the first pushpin and the second spring; and
a display coupling mechanism configured to be removably coupled to the rotating receiver of the base coupling mechanism, the display coupling mechanism configured to be fixedly coupled to and disposed within a slot on a side of a display portion of the computing device, the display coupling mechanism configured to rotate about an axis orthogonal to a direction that the first pushpin is actuated by the first spring when the display coupling mechanism is coupled to the rotating receiver of the base coupling mechanism, the rotating receiver is disposed within the slot on the side of the display portion and the display coupling mechanism configured to translate along the direction that the first pushpin is actuated by the first spring when the display coupling mechanism is decoupled from the rotating receiver of the base coupling mechanism.

10. The apparatus of claim 9, wherein the rotating receiver includes a cavity configured to receive the display coupling mechanism.

11. The apparatus of claim 9, wherein the display coupling mechanism includes a locking mechanism configured to removably couple the display coupling mechanism to the rotating receiver of the base coupling mechanism, the locking mechanism includes a plurality of spring-actuated latch members.

12. The apparatus of claim 9, further comprising:
a cam washer having a protrusion configured to contact at least one of the first pushpin and the second pushpin; and
a spring washer.

13. A computing device, comprising:
a base portion including a keyboard and a base coupling mechanism fixedly coupled to the base portion, the base coupling mechanism including a rotating receiver configured to rotate with respect to the base portion; and
a display portion having a slot on a side of the display portion, the display portion having a display coupling mechanism disposed within the slot and configured to be removably coupled to the rotating receiver of the base coupling mechanism, the display coupling mechanism having a portion configured to be disposed within a cavity of the rotating receiver, the portion of the display coupling mechanism having a thickness less than a thickness of the rotating receiver,
the display coupling mechanism configured to rotate about an axis intersecting the base coupling mechanism from a tablet configuration to a closed configuration when the display coupling portion is coupled to the rotating receiver of the base coupling mechanism, the display portion having a display surface substantially parallel to and facing toward the base portion when in the closed configuration, the display surface being substantially parallel to and facing away from the base portion when in the tablet configuration,
the display portion configured to translate along a first direction orthogonal to the axis when the display coupling mechanism is decoupled from the rotating receiver of the base coupling mechanism and the display portion is in the tablet configuration,
the display portion configured to translate along a second direction opposite the first direction and orthogonal to the axis when the display coupling mechanism is decoupled from the rotating receiver of the base coupling mechanism and the display portion is in the closed configuration.

14. The computing device of claim 13, wherein the display coupling mechanism is configured to be fixedly coupled to the display portion of the computing device.

15. The computing device of claim 13, wherein the base coupling mechanism includes a cam washer having a protrusion configured to contact a pushpin.

16. The computing device of claim 13, wherein the base coupling mechanism is configured to be disposed within the slot on the side of the display portion when the display coupling mechanism is translated along the first direction or the second direction, the base coupling mechanism is configured to be disposed within the slot on the side of the display portion when the display coupling mechanism is rotated about the axis.

17. The computing device of claim 1, wherein the portion of the display coupling mechanism protrudes from within the slot.

18. The computing device of claim 1, wherein the display coupling mechanism is configured to rotate about an axis intersecting the base coupling mechanism from a tablet configuration to a closed configuration, the display portion has a display surface that is substantially parallel to and facing toward the base portion when in the closed configuration, the display surface is substantially parallel to and facing away from the base portion when in the tablet configuration.

19. The computing device of claim 1, wherein the base coupling mechanism includes a first pushpin actuated by a first spring and a second pushpin actuated by a second spring, the second pushpin is disposed between the first pushpin and the second spring.

20. The computing device of claim 13, wherein the base coupling mechanism includes a first pushpin actuated by a first spring and a second pushpin actuated by a second spring, the second pushpin is disposed between the first pushpin and the second spring.

21. The computing device of claim 13, wherein the rotating receiver has a thickness approximately the same as a thickness of the slot when the display is slidably translated and the display coupling mechanism is decoupled from the rotating receiver, the thickness of the slot and the thickness of the rotating receiver are aligned along a direction orthogonal to a plane along which a viewable surface of the display portion is aligned when the display is slidably translated and the display coupling mechanism is decoupled from the rotating receiver.

* * * * *

UNITED STATES PATENT AND TRADEMARK OFFICE
CERTIFICATE OF CORRECTION

PATENT NO.        : 9,477,262 B2                                      Page 1 of 1
APPLICATION NO.   : 13/608925
DATED             : October 25, 2016
INVENTOR(S)       : Matsuoka et al.

It is certified that error appears in the above-identified patent and that said Letters Patent is hereby corrected as shown below:

In the Claims

In Column 19, Line 18, Claim 1, delete "maligned" and insert -- aligned --, therefor.

Signed and Sealed this
Seventh Day of March, 2017

Michelle K. Lee
*Director of the United States Patent and Trademark Office*